United States Patent
Circosta et al.

(10) Patent No.: US 10,904,749 B2
(45) Date of Patent: Jan. 26, 2021

(54) PROTOCOL FOR ESTABLISHING A SECURE COMMUNICATIONS SESSION WITH AN ANONYMOUS HOST OVER A WIRELESS NETWORK

(71) Applicant: Apple Inc., Cupertino, CA (US)

(72) Inventors: Nicholas J. Circosta, Mountain View, CA (US); Alejandro A. Rodriguez, Saratoga, CA (US); Bob Bradley, San Jose, CA (US); Daniel B. Pollack, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/256,717

(22) Filed: Jan. 24, 2019

(65) Prior Publication Data

US 2019/0230503 A1  Jul. 25, 2019

Related U.S. Application Data

(60) Provisional application No. 62/621,936, filed on Jan. 25, 2018.

(51) Int. Cl.
*H04W 12/02* (2009.01)
*H04L 29/08* (2006.01)
(Continued)

(52) U.S. Cl.
CPC ......... *H04W 12/02* (2013.01); *H04L 61/1511* (2013.01); *H04L 61/1541* (2013.01);
(Continued)

(58) Field of Classification Search
CPC ............. H04L 61/1511; H04L 61/1541; H04L 61/2015; H04L 63/0407; H04L 63/0442;
(Continued)

(56) References Cited

U.S. PATENT DOCUMENTS 7,434,046 B1 * 10/2008 Srivastava ............ H04L 9/0825
380/264
9,843,624 B1  12/2017 Taaghol et al.
(Continued)

FOREIGN PATENT DOCUMENTS

WO  2017023998 A1  2/2017
WO  2017167836 A1  10/2017

OTHER PUBLICATIONS

European Patent Application 19153479.1—Extended European Search Report dated Mar. 14, 2019.
(Continued)

*Primary Examiner* — Saad A. Waqas
(74) *Attorney, Agent, or Firm* — Dickinson Wright RLLP

(57) ABSTRACT

This application relates to techniques for anonymously establishing a secure communication session with a wireless client. A described method, performed by an anonymous wireless host, includes advertising a service implemented by the anonymous wireless host as available over a wireless network, receiving an invitation to establish the secure communication session with the wireless client, transmitting an acceptance of the invitation to the wireless client, and establishing the secure communication session over a communication channel. The invitation is received from the wireless client and the acceptance is transmitted to the wireless client via a broadcast address or a multicast address associated with the wireless network. The secure communication session is used to exchange encrypted data between the service and the wireless client.

20 Claims, 8 Drawing Sheets

(51) Int. Cl.
*H04L 29/12* (2006.01)
*H04L 29/06* (2006.01)
*H04W 12/00* (2009.01)
*H04W 12/04* (2009.01)
*H04W 8/00* (2009.01)
*H04W 24/08* (2009.01)
*H04W 48/16* (2009.01)
*H04W 4/70* (2018.01)

(52) U.S. Cl.
CPC ...... *H04L 63/0407* (2013.01); *H04L 63/0442* (2013.01); *H04L 63/061* (2013.01); *H04L 67/16* (2013.01); *H04W 8/005* (2013.01); *H04W 12/003* (2019.01); *H04W 12/0401* (2019.01); *H04W 12/04071* (2019.01); *H04W 24/08* (2013.01); *H04W 48/16* (2013.01); *H04L 61/2015* (2013.01); *H04W 4/70* (2018.02)

(58) Field of Classification Search
CPC .... H04L 63/061; H04L 67/16; H04W 12/003; H04W 12/02; H04W 12/0401; H04W 12/04071; H04W 24/08; H04W 48/16; H04W 4/70; H04W 8/005
See application file for complete search history.

(56) References Cited

U.S. PATENT DOCUMENTS

| | | | |
|---|---|---|---|
| 2007/0143489 A1* | 6/2007 | Pantalone | H04L 12/2836 709/230 |
| 2010/0304759 A1 | 12/2010 | Leppanen et al. | |
| 2013/0188515 A1* | 7/2013 | Pinheiro | H04L 67/16 370/254 |
| 2015/0365377 A1* | 12/2015 | Dvir | H04L 63/0272 709/219 |
| 2016/0249200 A1* | 8/2016 | Liu | H04L 12/189 |
| 2017/0279775 A1 | 9/2017 | Savolainen | |

OTHER PUBLICATIONS

Indian Application No. 201914002555—First Examination Report dated Aug. 3, 2020.

* cited by examiner

PROTOCOL FOR ESTABLISHING A SECURE COMMUNICATIONS SESSION WITH AN ANONYMOUS HOST OVER A WIRELESS NETWORK

CROSS-REFERENCE TO RELATED APPLICATIONS

The present application claims the benefit of U.S. Provisional Application No. 62/621,936, entitled "PROTOCOL FOR ESTABLISHING A SECURE COMMUNICATIONS SESSION WITH AN ANONYMOUS HOST OVER A WIRELESS NETWORK," filed Jan. 25, 2018, the content of which is incorporated herein by reference in its entirety for all purposes.

FIELD

The described embodiments relate to wireless communication, including a protocol for establishing a secure communications session with an anonymous host over a wireless network.

BACKGROUND

The Internet of Things (IoT) has led to an explosion of consumer devices configured to connect to a wireless network and to interact with other devices accessible via the wireless network (e.g., a smart phone, a desktop computer, a server in communication with the network via the Internet, etc.). Common IoT devices include wireless security cameras, speakers, thermostats, fire alarms, security sensors, televisions, set top boxes, and the like. Typically, a user installs a wireless access point in their home, assigns a service set identifier (SSID) to a wireless interface implemented by the wireless access point, and configures devices to connect to the wireless network associated with the SSID.

However, once the various devices connect to the wireless network, communication channels between devices still need to be established. For example, a device can be configured to access a remote server that is located over an Internet connection accessible through a gateway/wireless router on the wireless network. Alternatively, a device can register a service that is accessible through the wireless device so that other devices located on the wireless network can discover and access the service. Conventional network discovery techniques usually require an administrator of the wireless network to configure a device to register the available services associated with the device. In addition, various protocols may be provided so that clients can automatically discover different hosts connected to the network, and clients can send a message to the host to obtain a list of services provided by the host.

This type of extensive configuration for access to services via a wireless network discourages casual use of the services available via the wireless network by devices that are not owned or managed by the administrator of the wireless network. Furthermore, protocols that may ease this burden for the wireless network administrator may introduce security vulnerabilities within the wireless network. For example, such protocols may publish Internet Protocol (IP) addresses that correspond to devices that are connected to a wireless network, which may allow unauthorized users access to the wireless network. Therefore, what is desired is a technique to establish communications between devices over a wireless network that maintains anonymity of network devices to unauthorized users and does not require extensive intervention by a user of a device to configure the device to access select services of the wireless network.

SUMMARY

This Application describes various embodiments that relate to establishing a secure communication session with an anonymous host over a wireless network. A process is described, as performed by an anonymous wireless host, which includes advertising a service implemented by the anonymous wireless host as available over a wireless network, receiving an invitation to establish the secure communication session with the wireless client, transmitting an acceptance to the wireless client, and establishing the secure communication session over a communication channel. The invitation is received from the wireless client and the acceptance is transmitted to the wireless client via a broadcast address or a multicast address of the wireless network. The secure communication session is configured to exchange encrypted data between the service and the wireless client.

In some embodiments, a process is described, as performed by an wireless client, which includes discovering at least one service advertised as available over a wireless network, selecting a service in the at least one service that is implemented by the anonymous wireless host, transmitting an invitation to the anonymous wireless host to establish the secure communication session with the service, receiving an acceptance from the anonymous wireless host, and establishing the secure communication session over a communication channel. The invitation is transmitted to the anonymous wireless host and the acceptance is received from the anonymous wireless host via a broadcast address or a multicast address of the wireless network. The secure communication session is configured to exchange encrypted data between the service and the wireless client.

In some embodiments, advertising the service as available over the wireless network may be performed, by the anonymous wireless host, by transmitting an advertising message over the broadcast address or the multicast address of the wireless network. In some embodiments, the wireless client is configured to monitor the broadcast address or the multicast address in order to listen for advertising messages that indicate the service is available over the wireless network. In various embodiments, a multicast Domain Name System responder, separate and distinct from the anonymous wireless host and the wireless client, is configured to monitor the multicast address and register the service as available in response to receiving a register service request via the multicast address. In response to receiving the register service request, a plurality of Domain Name System (DNS) records are created by the multicast Domain Name System (mDNS) responder, which may include one or more of a service record, a pointer record, and a text record stored in a memory accessible to the multicast Domain Name System responder. The wireless client can then discover services available via the wireless network by sending a query to the multicast Domain Name System responder.

In some embodiments, discovering at least one service advertised as available over the wireless network may be performed, by the wireless client, by transmitting a discovery request over the broadcast address or the multicast address of the wireless network. In some embodiments, the anonymous wireless host is configured to monitor the broadcast address or the multicast address in order to listen for discovery requests from wireless clients to discover services available over the wireless network. In various embodiments, a multicast Domain Name System responder, separate and distinct from the anonymous wireless host and the wireless client, is configured to monitor the multicast address and to respond to discovery requests with a list of services registered by one or more hosts on the wireless network with the multicast Domain Name System responder.

In some embodiments, the invitation transmitted by the wireless client via the broadcast address or multicast address may be a message that includes a public key created by the wireless client for the secure communication session, an IP address of the wireless client, and a port number allocated by the wireless client for the secure communication session. The invitation also may include credentials associated with the wireless client. In various embodiments, the acceptance transmitted by the anonymous wireless host includes a public key created by the anonymous wireless host for the secure communication session. The public keys and corresponding private keys created by the anonymous wireless host and the wireless client may be ephemeral 256-byte keys that are discarded when the secure communication session is terminated.

In some embodiments, establishing the secure communication session includes creating a socket associated with a network interface corresponding to the address of the anonymous wireless host, connecting the socket to a corresponding socket of the wireless client, and establishing a tunnel between the socket and the corresponding socket. In some exemplary embodiments, establishing the secure communication session includes creating a socket associated with a network interface corresponding to an address of the wireless client, configuring the socket to listen for packets associated with a port number of the network interface, and establishing a tunnel between the socket and a corresponding socket of the anonymous wireless host. In various embodiments, the tunnel may be established through a relay server such that the socket and corresponding socket are not connected directly but are instead connected indirectly through a pair of additional sockets on the relay server associated via a relay connection within the relay server.

In some embodiments, the anonymous wireless host, configured to perform the process described above, and the wireless client are connected to a wireless network that includes one or more gateways, each gateway coupled to one or more access points. The wireless client may be connected to a first access point via a wireless interface of the wireless client. The anonymous wireless host may be connected to the first access point via the wireless interface of the anonymous wireless host. In various embodiments, the anonymous wireless host may be connected to a second access point via the wireless interface of the anonymous wireless host instead of the first access point. The first access point and the second access point may be connected to a single gateway. Alternatively, the first access point and the second access point are connected to different gateways, and a first gateway is configured to establish a network tunnel with a second gateway for relaying data packets transmitted from the wireless client to the anonymous wireless host. In various embodiments, a relay server, either included in the wireless network or accessible through an external network, is configured to allocate a relay connection to establish the secure communication session through the relay server.

Other aspects and advantages of the various embodiments described herein will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Figure 1:
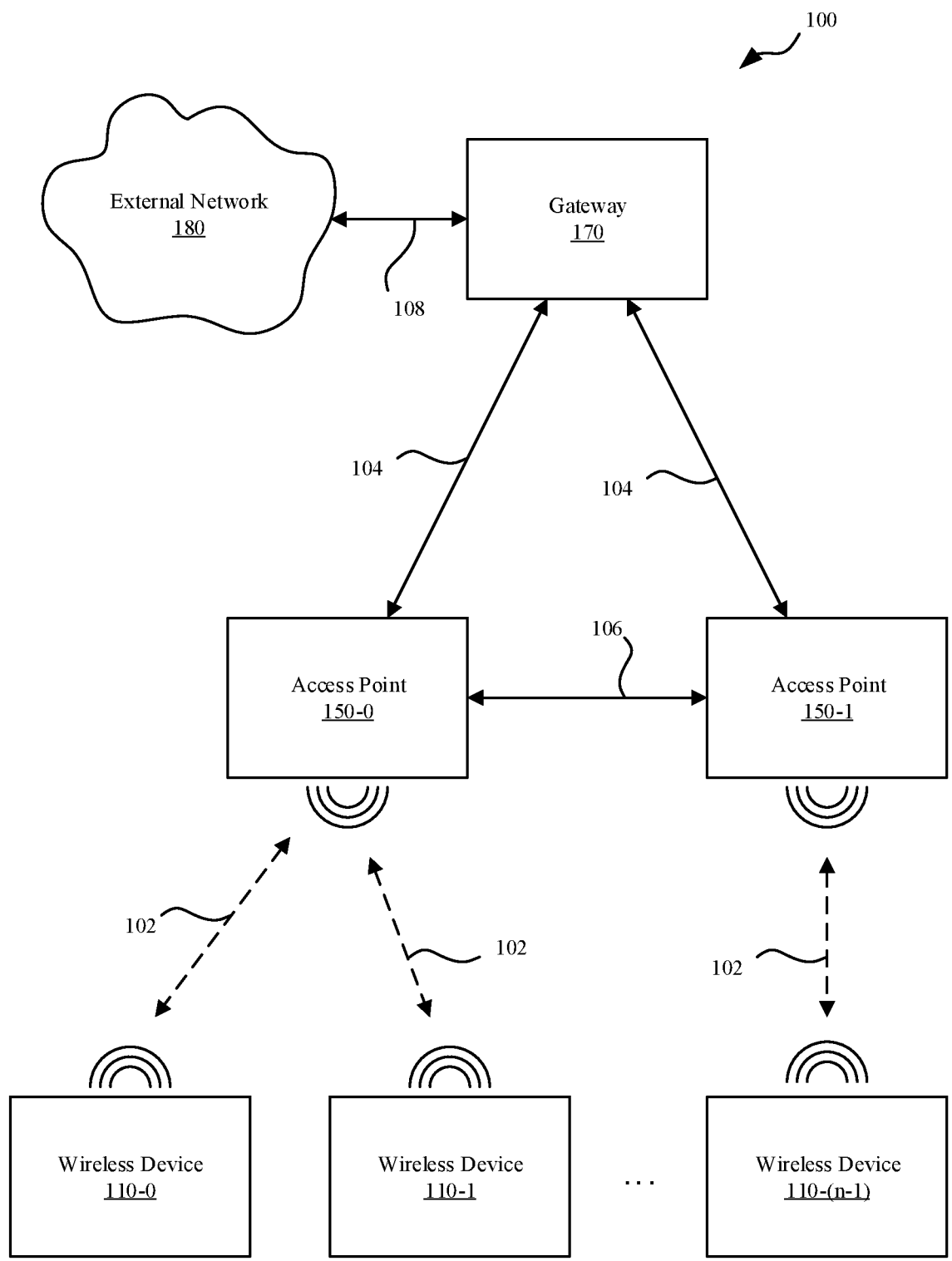
FIG. 1 illustrates an exemplary wireless network, in accordance with some embodiments.

Representative applications of methods and apparatus according to the present Application are described in this section. These examples are provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Network administrators may implement security measures within a wireless network to prevent certain devices on the wireless network from being discoverable by other devices. Lacking knowledge related to an address of a device may make it more difficult to exploit security flaws in the configuration of the device, thereby preventing individuals from exploiting those flaws. Disabling network discovery may make sense from a security perspective, but it may also make providing services to users of the network more difficult. For example, a network administrator may need to manually configure devices on the network to connect with a particular network host that provides a service. It would be advantageous if network discovery could be disabled while also allowing devices connected to the wireless network to be able to view services hosted on the wireless network and connect with a service without requiring information about the host that implements the service.

As described herein, a client device connected to a wireless network may utilize a protocol for discovering services implemented by anonymous hosts and for negotiating establishment of a secure communication session for transferring encrypted data between the client device and a service provided by the anonymous host. The negotiation can include sending an invitation to the anonymous host of a service using a broadcast address or a multicast address of the wireless network to negotiate establishment of the secure communication session. Information about a socket created by the client device for the secure communication session may be passed from the client device to the anonymous host via the broadcast address or the multicast address. In addition, public keys used for encryption of data transferred between the client device and the service provided by the anonymous host during the secure communication session may be exchanged using the broadcast address or the multicast address. Once the negotiation is complete, and the anonymous host has accepted the invitation received from the client, the anonymous host may connect with the socket created by the client device to establish the secure communication session over a communications channel. Only once the anonymous host connects with the socket will the address of the anonymous host be revealed to the client device. In some embodiments, the address of the anonymous host may remain anonymous even after the secure communication session is established, such as when the service utilizes a relay server to forward data between the service provided by the anonymous host and the client device.

In some embodiments, a multicast Domain Name System responder may be utilized by both the client device and the anonymous host to implement, at least in part, the negotiation via the multicast address of the wireless network. The anonymous host may utilize the multicast Domain Name System responder to register services as available over the wireless network, and the client device may query the multicast Domain Name System responder to discover available services. The multicast Domain Name System responder may be implemented by the anonymous host and configured to monitor the multicast address for invitations to establish a secure communication session and to transmit acceptances to the invitations to client devices. In various embodiments where the multicast Domain Name System responder is implemented by another host connected to the wireless network, the anonymous host may implement a separate process configured to monitor the multicast address for invitations to establish a secure communication session and to transmit acceptances to the invitations to client devices.

These and other embodiments are discussed below with reference to FIGS. 1-8; however, those skilled in the art will readily appreciate that the detailed description given herein with respect to these figures is for explanatory purposes only and should not be construed as limiting.

In accordance with various embodiments described herein, the terms "wireless communication device," "wireless device," "mobile device," "mobile station," "client device", "client" and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates an example of a wireless network 100, in accordance with some embodiments. The wireless network 100 may be referred to herein as a WLAN, a private network, a private WLAN, a WPAN, or the like. As shown in FIG. 1, the wireless network 100 includes a plurality of wireless devices 110-0 to **110-(*n*–1). Each wireless device 110 includes a wireless interface such as a radio frequency transceiver and one or more antennas for connecting to a communications channel via a wireless communications protocol, such as the IEEE 802.11 protocols. Each wireless device 110** may include a processor and memory for storing instructions for implementing various functions in hardware and/or software.

In some embodiments, the wireless devices 110 may be configured to communicate with one or more APs 150-0 to 150-1 via a wireless interface 102. Each AP 150 may include a radio frequency transceiver and one or more antennas for connecting to the wireless interface 102 via a wireless communications protocol, such as the IEEE 802.11 protocols. The APs 150 may be configured as a network switch such that the wireless device(s) 110 connected to a first AP 150-0 can communicate with the wireless device(s) 110 connected to a second AP 150-1.

In some embodiments, the one or more APs 150 may be connected to a gateway 170 via a network interface 104, which may be either a wired network interface (e.g., IEEE 802.3—Ethernet) or a wireless network interface (e.g., IEEE 802.11—Wi-Fi). In embodiments with two or more APs 150, each AP 150 may be connected to one or more other APs 150 via a network interface 106, which may be either wired or wireless. As shown in FIG. 1, the first AP 150-0 is connected to the second AP 150-1 via a wired network interface 106. Alternatively, the first AP 150-0 may not share a direct connection with the second AP 150-1; however, Ethernet frames may be forwarded from the first AP 150-0 to the second AP 150-1 through a gateway 170.

The gateway 170 is a device that allows data to be relayed between the wireless network 100 and an external network 180 via network interface 108. In some embodiments, the gateway 170 is a network router. The network router may be configured to relay Internet Protocol (IP) packets originating within the wireless network 100 to a device within the external network 180, such as the Internet. In some embodiments, the network router may also be configured to perform network address translation (NAT), which maps host addresses in one address space (e.g., a private IPv4 address space such as 192.168.0.0/16) to another address space (e.g., a public, unicast IPv4 address space) such that packets forwarded to the external network 180 from within the wireless network 100 appear to external devices to be originating at a single network address associated with the network interface 108 utilized by the gateway 170 to connect to the external network 180.

In some embodiments, the gateway 170 is connected to the external network 180 through a modulating device such as a digital subscriber loop (DSL) modem or a cable modem. In another embodiment, the gateway 170 is connected to the external network 180 through a cellular network utilizing a radio frequency transceiver and one or more antennas to connect with a base station (e.g., eNodeB, NodeB, etc.) of the cellular network. It will be appreciated that the gateway 170 may connect to two or more external networks using different network interfaces.

Although not shown explicitly, the wireless network 100 may also include other devices in addition to, or in lieu of, the devices shown in FIG. 1. These devices may include, but are not limited to, additional devices such as one or more servers, workstations, laptops, set top boxes, smart phones, wearable devices, Internet of Things (IoT) consumer electronic devices, and the like, which may be connected to the wireless network 100 via various wired or wireless interfaces. These devices may also include, but are not limited to, additional network hardware such as one or more additional switches, one or more additional gateways, one or more additional access points, and the like.

In some embodiments, the functionality of the gateway 170 and an AP 150 may be combined into a single device, which may be referred to as a residential wireless router. The device may include both wired network interface(s), such as Ethernet ports, and wireless network interface(s) such as Wi-Fi enabled radios. In some embodiments, multiple transceivers/antennas may be configured to provide APs for two different wireless interfaces, such as an AP implementing the IEEE 802.11n protocol on the 2.4 GHz band as well as an AP implementing the IEEE 802.11n protocol on the 5 GHz band.

Figure 2:
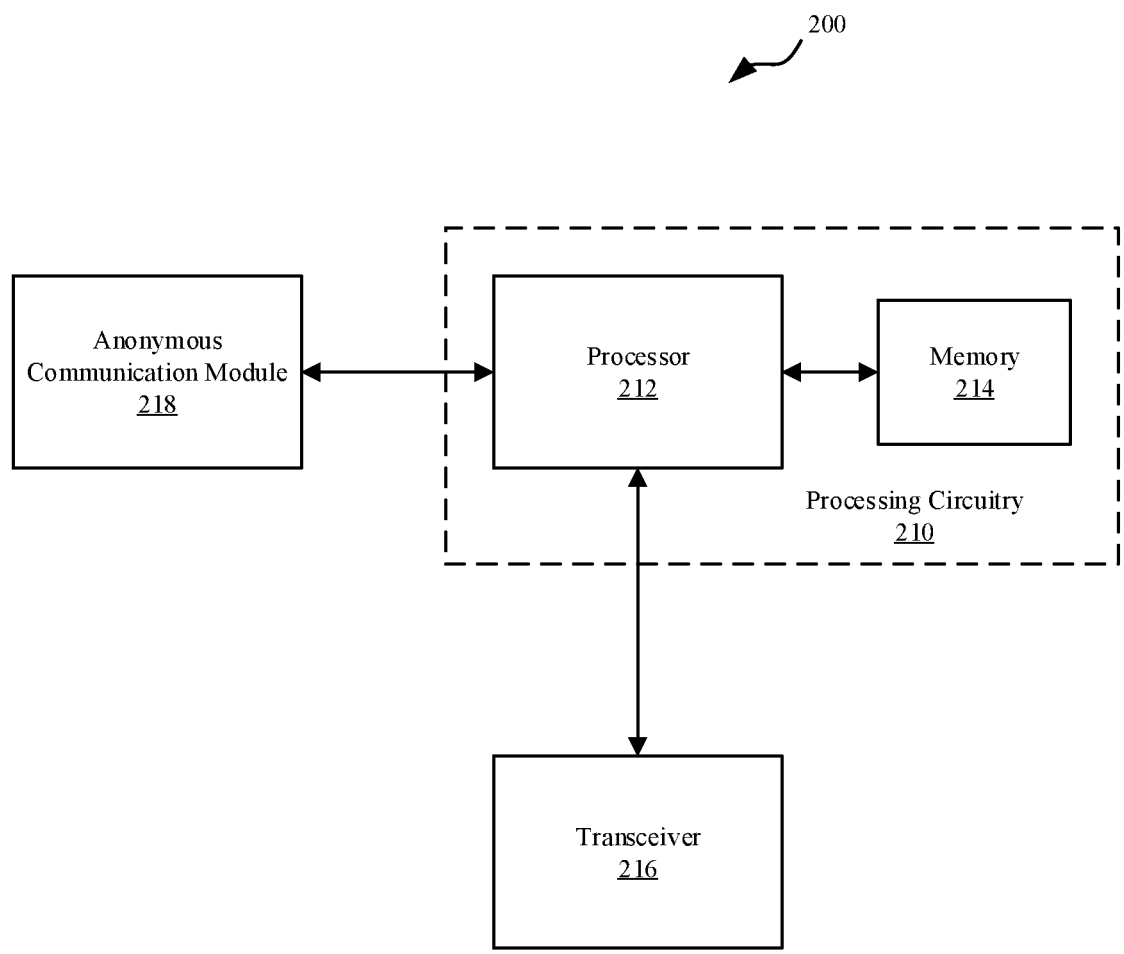
FIG. 2 illustrates a block diagram of an exemplary apparatus that can be implemented in a wireless device, in accordance with some embodiments.

FIG. 2 illustrates a block diagram of an exemplary apparatus 200 that can be implemented in a wireless device 110, in accordance with some embodiments. In this regard, when included in a computing device, such as wireless device 110, apparatus 200 can enable the computing device to operate within the wireless network 100 in accordance with one or more embodiments. It will be appreciated that the components, devices, or elements illustrated in and described with respect to FIG. 2 may not be mandatory and, therefore, some components, devices, or elements may be omitted in certain embodiments. Additionally, some embodiments may include different components, devices, or elements in addition to or in lieu of those components, devices, or elements illustrated in and described with respect to FIG. 2.

In some embodiments, the apparatus 200 can include processing circuitry 210 that can be configured to perform actions in accordance with one or more embodiments disclosed herein. In this regard, the processing circuitry 210 can be configured to perform and/or control the performance of one or more functionalities of the apparatus 200 in accordance with various embodiments and, therefore, can provide means for performing functionalities of the apparatus 200 in accordance with various embodiments. The processing circuitry 210 can be configured to perform data processing, application execution, and/or other processing and management services according to one or more embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset comprising one or more chips. In some embodiments in which one or more components of the apparatus 200 are embodied as a chipset, the chipset can be capable of enabling a computing device to operate in the wireless network 100 when implemented on or otherwise operably coupled to the computing device. Thus, for example, one or more components of the apparatus 200 can provide a chipset configured to enable a computing device to communicate using one or more wireless network technologies.

In some embodiments, the processing circuitry 210 can include a processor 212 and, in some embodiments, such as that illustrated in FIG. 2, can further include memory 214. The processing circuitry 210 can be in communication with or otherwise control a transceiver 216 and/or an anonymous communication module 218.

The processor 212 can be embodied in a variety of forms. For example, the processor 212 can be embodied as various processing hardware-based means such as a microprocessor, a coprocessor, a controller or various other computing or processing devices including integrated circuits such as, for example, an application specific integrated circuit (ASIC), a field programmable gate array (FPGA), some combination thereof, or the like. Although illustrated as a single processor, it will be appreciated that the processor 212 can include a plurality of processors. The plurality of processors can be in operative communication with each other and can be collectively configured to perform one or more functionalities of the apparatus 200 as described herein. In some embodiments, the processor 212 can be configured to execute instructions that can be stored in the memory 214 or that can be otherwise accessible to the processor 212. As such, whether configured by hardware or by a combination of hardware and software, the processor 212 can be capable of performing operations according to various embodiments while configured accordingly.

In some embodiments, the memory 214 can include one or more memory devices. The memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions, and/or the like for enabling the apparatus 200 to carry out various functions in accordance with one or more embodiments. In some embodiments, the memory 214 can be in communication with one or more of the processor 212, the transceiver 216, or the anonymous communication module 218 via a bus or buses for passing information among components of the apparatus 200.

The apparatus 200 can further include the transceiver 216. The transceiver 216 can be configured to enable the apparatus 200 to send and receive wireless signals in accordance with one or more wireless technologies, such as one or more versions of IEEE 802.11 wireless communications protocols, cellular technologies (e.g., CDMA, GSM, LTE, etc.), or the like. As such, the transceiver 216 can enable the apparatus 200 to send signals to and receive signals from a neighboring device with a corresponding transceiver.

The apparatus 200 can further include the anonymous communication module 218. The anonymous communication module 218 can be embodied as various means, such as circuitry, hardware, a computer program product comprising computer readable program instructions stored on a computer readable medium, e.g., the memory 214, and executed by a processing device, e.g., the processor 212, or some combination thereof. In some embodiments, the processor 212 (or the processing circuitry 210) can include, or otherwise control the anonymous communication module 218.

The anonymous communication module 218 of some embodiments can be configured to establish a secure communication session between the apparatus 200 and a corresponding wireless device. When the apparatus 200 is configured as a host of a service implemented by the processor 212, the anonymous communication module 218 establishes the secure communication session using a protocol that allows the apparatus 200 to remain anonymous to a client device until the secure communication session is established with the client device by the apparatus 200. When the apparatus 200 is configured as a client of a service implemented by a host, then the anonymous communication module 218 establishes the secure communication session using a protocol that allows the apparatus 200 to connect with the service even though the host remains anonymous to the client device until the secure communication session is established. As referred to herein, anonymity of the host refers to the client device communicating with the host without using an address that uniquely identifies the host on the wireless network. For example, a host may remain anonymous where communications are directed to a broadcast address or to a multicast address over a wireless network rather than using a unicast address assigned to the host. Even though the service may be uniquely identified with a label, a host name, or other unique identifier, the identifying information for the service does not reveal the address of the host, which, if revealed, could introduce security vulnerabilities to the wireless network. For example, a guest connected to the wireless network could be prevented from discovering devices connected to the wireless network, but advertising the address of a service implemented by the host would inherently disclose the address for the host, which may defeat security measures that were installed by disabling network discovery. Therefore, the anonymous communication module 218 allows a client device connected to the wireless network to implement a protocol for establishing a secure communication session with a host that remains anonymous to the client device until the host accepts an invitation to establish the secure communication session and connects with the client device.

Figure 3:
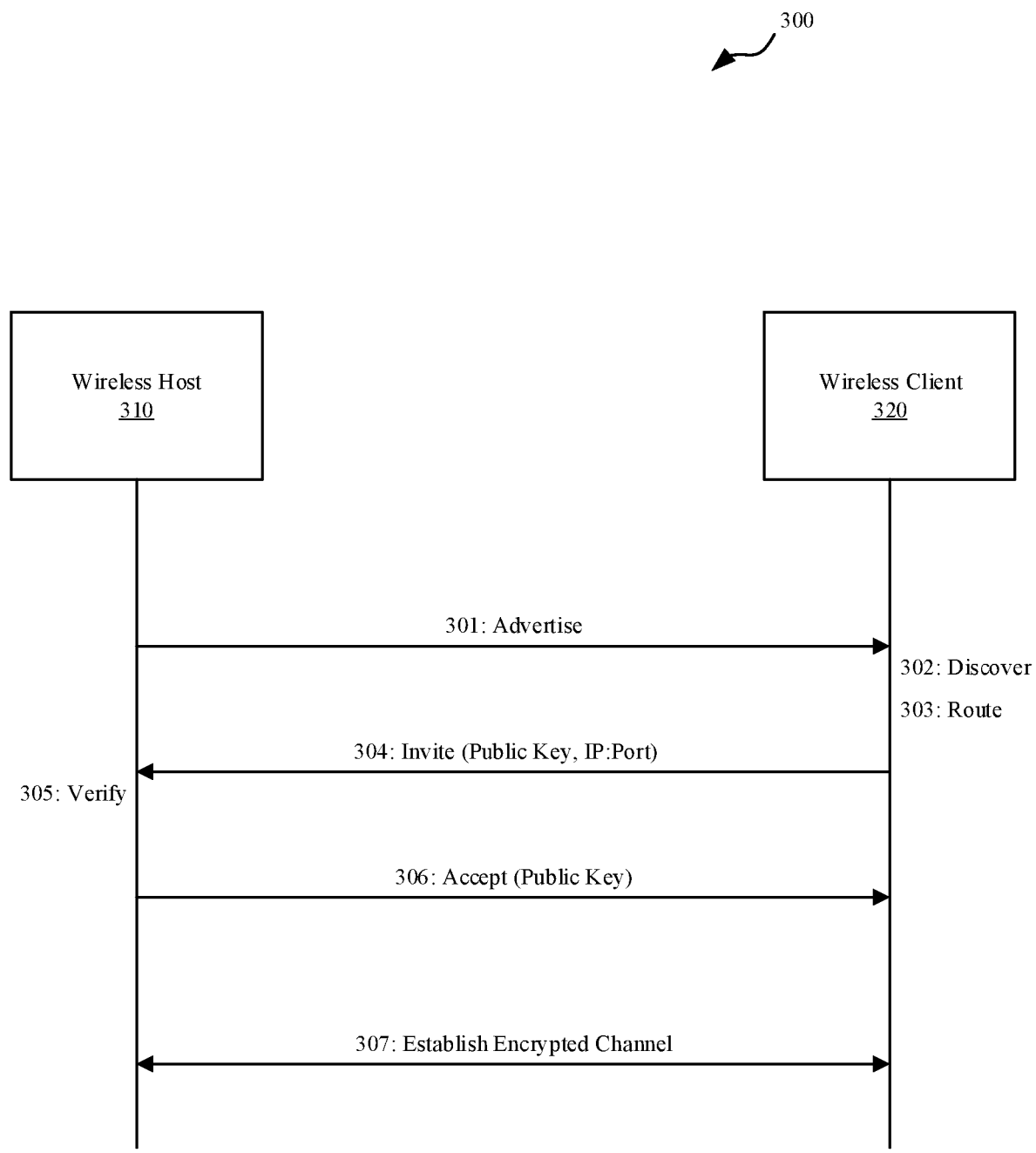
FIG. 3 illustrates an exemplary protocol for establishing a secure communication session between a wireless client and an anonymous wireless host over the wireless network, in accordance with some embodiments.

FIG. 3 illustrates an exemplary protocol 300 for establishing a secure communication session between a wireless client and an anonymous wireless host over the wireless network 100, in accordance with some embodiments. As shown in FIG. 3, the protocol 300 may be implemented by a wireless host 310 in conjunction with a wireless client 320. Alternatively, the protocol 300 may be implemented by a wireless client 320 in conjunction with a wireless host 310.

In some embodiments, the wireless host 310 is a first wireless device 110 within the wireless network 100, and the wireless client 320 is a second wireless device 110 within the wireless network 100. The wireless host 310 and the wireless client 320 may each be connected to an AP 150 of the wireless network 100 and may each be assigned a unique address on the wireless network 100. In some embodiments, a Dynamic Host Configuration Protocol (DHCP) server is implemented within the wireless network 100, and devices may be configured to request an IP address from the DHCP server when each device connects to the wireless network 100. In some embodiments, devices utilize a link-local addressing protocol to assign IP addresses when a device connects to the wireless network 100. In yet another embodiment, devices may be manually configured and issued a static IP address to utilize when connected to the wireless network 100.

The wireless host 310 may be any wireless device that offers a service to other devices over the wireless network 100. The wireless client 320 may be any wireless device that can be configured to access the service implemented by the wireless host 310. The wireless host 310 and the wireless client 320 may be connected to a single AP 150 to or separate APs 150. For example, in some embodiments, the wireless host 310 may be connected to the first AP 150-0 and the wireless client 320 may be connected to the second AP 150-1. Alternatively, both the wireless host 310 and the wireless client 320 may be connected to the first AP 150-0.

Conventionally, over a wireless network such as wireless network 100, a wireless client 320 searches for available wireless networks within range of the wireless client 320 by listening for beacon frames on a particular wireless frequency. APs can be configured to transmit beacon frames periodically to announce the presence of a wireless network to any devices within range of a particular AP. The beacon frame can include, among other data, a Service Set Identifier (SSID) associated with the wireless network, a timestamp, a beacon interval, capability information, and other parameters. The wireless client 320 can access the wireless network using information included in the beacon frame. When the wireless network is configured as a secure wireless network, e.g., by using Wired Equivalent Privacy (WEP), Wi-Fi Protected Access (WPA), or the like, the user of the wireless client 320 may ask an administrator of the wireless network for credentials (e.g., an encryption key) in order to access the wireless network.

Once the wireless client 320 connects to the wireless network 100, the wireless client 320 may seek to discover other devices and/or services available over the wireless network 100. In some embodiments, a user of the wireless client 320 may need to request that the administrator to provide the user with an IP address for a particular device, and the user may manually configure the wireless client 320 to access the particular device by manually entering the IP address associated with the particular device. Alternatively, the administrator of the wireless network may implement a local Domain Name System (DNS) server for the wireless network, such that the local DNS server maps host names within the local domain to a corresponding private IP address within wireless network. The administrator may give the user of the wireless client 320 a host name, instead of an IP address, through which the wireless client 320 may access a particular device. Using a DNS server may be advantageous when devices are assigned dynamic IP addresses upon connecting to the wireless network by a DHCP server. Various services implemented by a device may be registered with the local DNS server to be accessed using a static domain name that is re-mapped to a new IP address each time the device connects to the wireless network.

It will be appreciated that these conventional techniques may be cumbersome to a user of the wireless client 320, especially when the user is not the administrator of the wireless network. When the user is the administrator of the wireless network, the configuration may also be burdensome as the administrator needs to configure the network manually to make the service provided by the wireless host 310 accessible to the wireless client 320. When the user is not the administrator of the wireless network, however, the conventional techniques may prevent the wireless client 320 from accessing a service provided by the wireless host 310, e.g., when the administrator cannot be contacted to obtain configuration information associated with the service. For example, a user may be provided a password to access a wireless network 100, but may be unable to connect to a wireless speaker connected to the wireless network to play audio data through the speaker without having additional configuration information (e.g., IP address, port, credentials, etc.) to access a service implemented by the wireless speaker.

Ideally, the wireless client 320 should be able to establish a connection with the wireless host 310 without requiring knowledge of any specific configuration information. For example, an administrator of the wireless network 100 may want to add a wireless host 310 to the wireless network 100 and to provide access to a service implemented by the wireless host 310 to guests using devices connected to the wireless network 100. The administrator, however, may prefer to publish a limited amount of information that publicly identifies that the service is available over the wireless network 100 and that enables guest devices to connect with the wireless host 310 and access the service. For example, in some embodiments, the wireless client 320 may request access to the service implemented by the wireless host 310 simply by using a host name tied to the service.

As shown in FIG. 3, the protocol 300 can be initiated by the wireless host 310 at 301, where the wireless host 310 advertises that a service is available over the wireless network 100. In some embodiments, an advertising message can be broadcast to devices on the wireless network 100 utilizing a broadcast address. For example, a broadcast address for a local subnet using IPv4 addresses can be created by performing a bitwise OR of the complement of the subnet mask with the IP address of the host (e.g., 192.168.1.10|(~255.255.0.0)). The payload of the advertising message may identify the service implemented by the wireless host 310 using a host name associated with the service. In some embodiments, the advertising message can be multicast to devices on the wireless network 100 utilizing a multicast address. Whereas all devices connected to the wireless network 100 listen for data packets sent to the broadcast address, only a subset of the wireless devices connected to the wireless network 100 may listen for data packets sent to a particular multicast address. In some embodiments, the wireless host 310 may advertise the service by registering the service with a server on the wireless network 100. An advertising message can be transmitted via unicast address directly to a registration service implemented by the server, which may be configured to keep records of all services available on the wireless network 100. In some embodiments, the records are stored in a database in a memory accessible to the registration service.

After the wireless host 310 advertises the service over the wireless network 100, at 302, the wireless client 320 discovers services available over the wireless network 100. In some embodiments, discovery may include monitoring a broadcast address or multicast address to receive data packets that include a payload that identifies a service as being available over the wireless network 100. In some embodiments, discovery may include transmitting a discovery request to a server to return a list of services that are available over the wireless network 100.

Once a list of available services has been received by the wireless client 320, at 303, the wireless client 320 determines a route associated with a service in the list of available services. Determining a route may include selecting one of the services identified in the list of available services discovered by the wireless client 320. In some embodiments, each service is advertised with a unique identifier that may be used to refer to the service. The identifier may include a character string used to refer to the service. In some embodiments, the identifier includes a host name associated with the service and does not explicitly list an IP address associated with the wireless host 310. For example, an identifier for an audio reproduction service implemented by a wireless speaker may include a character string "My_Speaker._airplay._tcp.local." that uniquely identifies a service for playing audio received by the service via the wireless speaker from any device within a local subnet of the wireless network 100.

In some embodiments, the wireless client 320 automatically determines a particular route based on capabilities associated with a service that is discovered. For example, a service identifier may include a service type that indicates one or more capabilities implemented by the wireless host 310 in connection with the service. The wireless client 320 may be configured to automatically filter the available services by service type and then select one of the filtered services based on additional criteria, such as a priority level or other information included in the advertising message. In some embodiments, the wireless client 320 may be configured to store records of particular services previously accessed by the wireless client 320, and the wireless client 320 may be configured to automatically select a service that has been previously accessed by the wireless client 320 as the particular route.

In some embodiments, the wireless client 320 prompts a user of the wireless client 320 to determine the particular route by at least selecting a service from a list of available services. For example, a voice call application on a cellular phone may prompt a user to select a particular service for routing audio through a wireless speaker when one or more wireless hosts 310 advertise audio reproduction services that are accessible through the wireless network 100. The user may manually determine a particular route from a list of routes using a user interface displayed on a screen of the cellular phone.

In order to establish a secure communication session with the service implemented by the wireless host 310 and advertised to the wireless client 320, at 304, the wireless client 320 invites the wireless host 310 to establish the secure communication session with the wireless client 320. In some embodiments, the wireless client 320 transmits an invitation message to the wireless host 310 using a broadcast address of the wireless network 100. The wireless host 310 includes a process configured to listen for invitation messages transmitted via the broadcast address. The invitation messages transmitted by the wireless client 320 includes a public key, created by the wireless client 320 for encrypting data transmitted between the service and the wireless client 320 during the secure communication session, as well as an IP address and port number associated with a socket created by the wireless client 320 for the secure communication session. The public key can be a k-bit character string associated with an asymmetric cryptography encryption/decryption algorithm for transmitting encrypted data between the wireless client 320 and the wireless host 310 and for decrypting the data on either end using corresponding private keys. In some embodiments, the public key can be an ephemeral 256-byte (e.g., 2048-bit) key created by the wireless client 320 for use with a particular communication session. In other words, the public key can be used only for a single communication session and can be discarded when the communication session terminates. The public key can also be associated with a corresponding private key that pairs with the public key, but is not shared with the wireless host 310.

In some embodiments, the wireless client 320 transmits an invitation message to the wireless host 310 using a multicast address of the wireless network 100. The wireless host 310 includes a process configured to listen for invitation messages transmitted via the multicast address. It will be appreciated that transmitting the invitation message via either the broadcast address or via the multicast address allows the wireless client 320 to request a secure communication session be established between the service implemented by the wireless host 310 and the wireless client 320 without revealing any identifying information about the wireless host 310 to the wireless client 320, such as an IP address assigned to the wireless host 310. This functionality provides for services to be advertised over the wireless network 100 within a local domain to guest devices on the wireless network 100 without compromising the security of the wireless network 100, which could occur, for example, when publishing a list of IP addresses and/or port numbers associated with available services on the wireless network 100.

At 305, the wireless host 310 receives the invitation message and verifies the authenticity of the invitation message. In some embodiments, the invitation message is signed with a digital certificate associated with the wireless client 320. The digital certificate can be verified independently using public keys associated with various certificate authorities. The wireless host 310 may also determine whether to allow the wireless client 320 to access the service requested by the invitation message. For example, the wireless host 310 may block particular IP addresses or ports within the wireless network 100 from accessing the service. Consequently, the wireless host 310 may be configured to determine whether to allow the wireless client 320 to access the service based on the information provided in the invitation message. If the wireless host 310 determines that the wireless client 320 is denied access to the service, then the wireless host 310 refrains from sending an acceptance message to the wireless client 320 in response to the invitation message. The wireless client 320 may set a timer for determining when an invitation message should expire. If the timer expires before receiving an acceptance message from a wireless host 310, then the wireless client 320 may rescind the invitation message and determine a different route from the list of available services.

However, if the wireless host 310 determines that the wireless client 320 is granted access to the service, then, at 306, the wireless host 310 transmits an acceptance message to the wireless client 320. In some embodiments, the wireless host 310 transmits the acceptance message to the wireless client 320 using a broadcast address of the wireless network 100. The wireless client 320 can include a process configured to listen for acceptance messages transmitted via the broadcast address. In some embodiments, the wireless host 310 transmits the acceptance message to the wireless client 320 using a multicast address of the wireless network 100. The wireless client 320 can include a process configured to listen for acceptance messages transmitted via the multicast address.

The acceptance message can include a public key associated with the wireless host 310. The public key can be a k-bit character string associated with an asymmetric cryptography encryption/decryption algorithm for transmitting encrypted data between the wireless host 310 and the wireless client 320 and decrypting the data on either end using corresponding private keys. In some embodiments, the public key can be an ephemeral 256-byte (e.g., 2048-bit) key created by the wireless host 310 for use with a particular communication session. The public key can also be associated with a corresponding private key that is paired with the public key, but is not communicated to the wireless client 320.

At 307, a secure communication session over a communication channel is established by the wireless host 310. The secure communication session can be established according to a protocol that implements asymmetric cryptography for authentication and encryption. In some embodiments, the secure communication session creates a network tunnel established between a socket associated with the wireless host 310 and a socket associated with the wireless client 320. The socket associated with the wireless client 320 can be bound to the IP address and port number provided by the wireless client 320 in the invitation message. The socket associated with the wireless host 310 can be bound to the IP address of the wireless host 310 and a port number allocated to a service instance implemented by the wireless host 310 for the secure communication session.

As used herein, a network tunnel refers to a connection through which data packets are encrypted and encapsulated within another data packet as a payload. The wireless client 320 can create one or more data packets for transmission via the network tunnel that includes unencrypted data as one or more payloads in the one or more data packets. Each data packet of the one or more data packets can be encrypted according to an encryption algorithm using the private key for the wireless client 320 and a public key for the wireless host 310. Each encrypted packet can be encapsulated into another data packet as a payload of the another data packet, which can also include an unencrypted packet header used to transmit the another data packet to the wireless host 310 via the communication channel. The wireless host 310, upon receipt of the another data packet, can extract the payload from the another data packet and decrypt the payload using the public key provided by the wireless client 320 in the invitation message and a private key of the wireless host 310. The decrypted data packet can then be processed by the wireless host 310 like a normal, unencrypted data packet. The wireless host 310 can transmit data packets to the wireless client 320 in a similar manner by encrypting data packets using the private key for the wireless host 310 and a public key for the wireless client 320, encapsulating encrypted data packets into additional data packets, transmitting the additional data packets to the wireless client 320, which can be configured to decrypt the additional data packets using the public key provided by the wireless host 310 in the acceptance message and a private key of the wireless client 320.

It will be appreciated that the protocol 300, described above, allows a guest device on a wireless network to discover services available on the wireless network 100 and request access to those services without any identifying information about the hosts of those services being revealed on the wireless network 100. This anonymity feature may be used to preserve security measures of the WLAN when network discovery is disabled.

In some embodiments, the wireless host 310 and the wireless client 320 include software to implement zero-configuration networking, which refers generally to a set of protocols for performing IP address assignment, host name resolution, and service discovery. The set of protocols may include: an implementation of a link-local addressing protocol that specifies how addresses are assigned to hosts when they connect to a wireless network; an implementation of a multicast DNS protocol that specifies how to perform DNS queries using IP multicast addresses; and an implementation of a DNS service discovery protocol that specifies how a host registers services and clients discover services available over a wireless network.

The link-local addressing protocol randomly selects an address from a range of reserved addresses for a host when connecting to the wireless network. For example, a range of IPv4 addresses can be reserved for link-local addresses in the address block 169.254.0.0/16, and a range of IPv6 addresses can be reserved for link-local addresses in the address block fe80::/64. Prior to using the randomly selected address, the host probes the wireless network to determine whether another host on the wireless network is already using the address. If a reply to the probe is received, then the address is in use, and the host will randomly select another address from the range of reserved addresses and repeat the process. If no reply is received, then the address is available to be used by the host.

The multicast DNS (mDNS) protocol reserves a ".local" pseudo top-level-domain (TLD) for host names in a local area network (e.g., wireless network 100). Host names are labels (e.g., unique identifiers) assigned to a particular device located on a network. Host names may be structured into different domains, where each sub-domain in the host name is separated by a period. The Domain Name System uses registrars that keep records that map host names to device addresses (e.g., IP addresses). Each registrar implements one or more DNS servers that are configured to accept DNS queries to translate a given host name into an IP address. Consequently, a device may translate host names into IP addresses by sending a DNS query to a known IP address of a DNS server. In contrast to the standard DNS, the mDNS protocol performs a DNS lookup by transmitting a DNS query to a multicast address (e.g., reserved multicast IPv4 address 224.0.0.251, reserved multicast IPv6 address FF02::FB, etc.) rather than transmitting the DNS query to a known unicast IP address associated with a DNS server. Other devices on the network may be configured to implement an mDNS responder, which is a process implemented in one or more hosts that is configured to monitor the multicast address for DNS queries and to resolve host names included in the DNS queries. Upon detection of a DNS query, and subsequently successfully resolving the host name included in the DNS query, the mDNS responder transmits a response to the DNS query that includes the IP address corresponding to the host name in the DNS query. This enables devices on the network to be addressed via a host name on the .local pseudo TLD without implementing a traditional DNS server on the network to resolve .local TLD host names.

The DNS service discovery protocol enables various hosts connected to a network to advertise services implemented by the host and enables clients connected to the network to discover services advertised by one or more hosts. Each host, after being connected to a local network, may initiate a service on a particular port of the host's network interface, which can be assigned a network address via manual configuration (e.g., static IP), DHCP, or the link-local addressing protocol discussed above. Once the host has started the service, the host advertises the service to any mDNS responders on the network. More specifically, the host periodically, and in an exponentially decaying manner, transmits a register service record via a multicast address. Any mDNS responders listening to the multicast address on the network can receive the register service request and register the service according to the host name for the service included in the register service record. Clients can query the mDNS responder for what services are available within a local subnet using a DNS query for a particular host name that specifies a service type.

In some embodiments, at 301, the wireless host 310 advertises a service on the wireless network 100 using a DNS service discovery protocol. The wireless host 310 may transmit a register service request over a multicast address to any mDNS responders implemented by one or more hosts on the wireless network 100 that are configured to monitor the multicast address. The one or more mDNS responders may receive the register service request and create a plurality of DNS records for the service including a service record, a pointer record, and a text record.

The service record can include two pieces of information that identify a service: a host name and a port number. The port number identifies the User Datagram Protocol (UDP) or Transmission Control Protocol (TCP) port for the service, and the host name indicates the domain name that identifies the service. The host name may include a structured list of sub-domains formatted according to the following convention: "<Instance Name>.<Service Type>.<Domain>". The <Domain> string can be a standard DNS domain, which may be listed as "local." for services restricted to the local link. The <Service Type> can be a standard IP protocol name (as registered by the IANA—Internet Assigned Numbers Authority), preceded by an underscore, followed by the host-to-host transport protocol (e.g., TCP or UDP), preceded by an underscore. The <Instance Name> string can be a unique identifier for a particular service instance.

The pointer record resembles the service record, but the pointer record maps the service type (e.g., <Service Type>.<Domain>) to a service host name and port number. The pointer record provides for easy service discovery by querying the mDNS responder according to a service type.

The text record resembles the service record but can contain additional information, such as a mapping of multiple services of the same service type, located at the same IP address and port number, to different service names, which may be referred to as service name aliasing.

In some embodiments, the wireless host 310 implements an mDNS responder locally and advertises the service on the network by registering the service with the local mDNS responder, thereby creating DNS records within a memory of the wireless host 310. The local mDNS responder may then resolve host names in DNS queries made over the multicast address using the local records.

At 302, the wireless client 320 transmits a service discovery request via the multicast address. For example, the wireless client 320 may transmit a request to any mDNS responders monitoring the multicast address on the wireless network 100 to return a list of services matching a query based on a particular service type (e.g., "_printer._tcp", "_music._tcp", etc.). The mDNS responders on the wireless network 100 can return any pointer records that match the query. At 303, the wireless client 320 determines a particular route by selecting a particular instance of a service associated with one of the returned pointer records.

At 304, the wireless client 320 transmits an invitation message to the wireless host 310 via the multicast address associated with the mDNS responders. The invitation message includes an IP address of the wireless client 320 and a port number allocated by the wireless client 320 for establishing a connection with the wireless host 310. It will be appreciated that the host name for the service returned in the pointer record may differ from the host name for the wireless host 310. Furthermore, although the host name for the service, in some instances, may include a domain that can be mapped to a specific IP address using a DNS query transmitted over the multicast address, the wireless host 310 may remain anonymous by using the "local." domain, which cannot be directly mapped to a specific IP address of the wireless host 310.

At 305, the wireless host 310 verifies the invitation received from the wireless client 320. Verification may include any method of authentication, including checking credentials (e.g., certificate verification) associated with the wireless client 320. The credentials may be transmitted in the invitation, such as by using a certificate to sign the invitation or by including a username and password for the wireless client 320 within the invitation along with the public key, IP address, and port number. It will be appreciated, that in some embodiments, the operation at 305 is optional and may be omitted from the protocol 300.

In some embodiments, authentication refers to ensuring that the wireless client 320 is produced by the same manufacturer as the anonymous wireless host 310, thereby only devices produced by the same manufacturer may be authorized to establish a secure communication session with the wireless host 310. For example, the manufacturer may hardcode authentication credentials in software included in both the wireless host 310 and the wireless client 320. The authentication credentials may be shared by the wireless client 320 with the wireless host 310, which can check the authentication credentials provided by the wireless client 320 against corresponding authentication credentials stored in the wireless host 310. Other techniques for verifying that the wireless client 320 is produced by the same manufacturer as the wireless host 310 are contemplated as being within the scope of the present description of protocol 300.

At 306, the wireless host 310 transmits an acceptance message to the wireless client 320 using the multicast address. The wireless client 320 includes a process configured to listen to the multicast address for an acceptance message sent by the wireless host 310 in response to the invitation message sent via the multicast address. The acceptance message includes a public key associated with the wireless host 310. The public key can be ephemeral and be generated for establishing a specific communication session with the wireless client 320.

At 307, the wireless host 310 establishes a secure communication session with the wireless client 320. The secure communication session can be established according to a communications protocol that implements asymmetric cryptography for authentication and encryption. In some embodiments, the secure communication session utilizes a network tunnel established between a socket associated with the wireless host 310 and a socket associated with the wireless client 320. The socket associated with the wireless client 320 can be bound to the IP address and port number provided by the wireless client 320 in the invitation message. The socket associated with the wireless host 310 can be bound to the IP address of the wireless host 310 and a port number allocated to a service instance implemented by the wireless host 310 for the secure communication session.

It will be appreciated that the protocol 300 is a handshaking protocol between a client and an anonymous host for establishing a secure communication session between the service implemented by the anonymous host and the client. For example, the mDNS protocol and DNS service discovery protocol can be utilized to bootstrap a network tunnel between a client and an anonymous host. The protocol 300 allows the wireless host 310 to remain anonymous until the host decides to connect with the wireless client 320 by establishing the secure communication session with the wireless client 320.

It will be appreciated that the wireless network 100 can represent typical WLANs used in residential environments. Typically, the wireless network 100 can include a small number of wireless APs 150 (e.g., one or two) and a single gateway 170 (or router) coupled to an external network 180, such as through a DSL modem, via a cable modem, and/or connected to a hybrid fiber-coaxial (HFC) broadband network of a service provider. The wireless network 100 may have tens of devices connected to the wireless network 100. However, the protocol 300 is not limited to a residential environment. The protocol 300 may be implemented in a commercial setting such as airports, multi-building campuses, or arenas/stadiums that may include many more access points and gateways, and can be configured to handle thousands of connected devices. Furthermore, the protocol may be implemented for an enterprise network that includes multiple gateways at various locations around the world connected via an external network such as the Internet.

Figure 4:
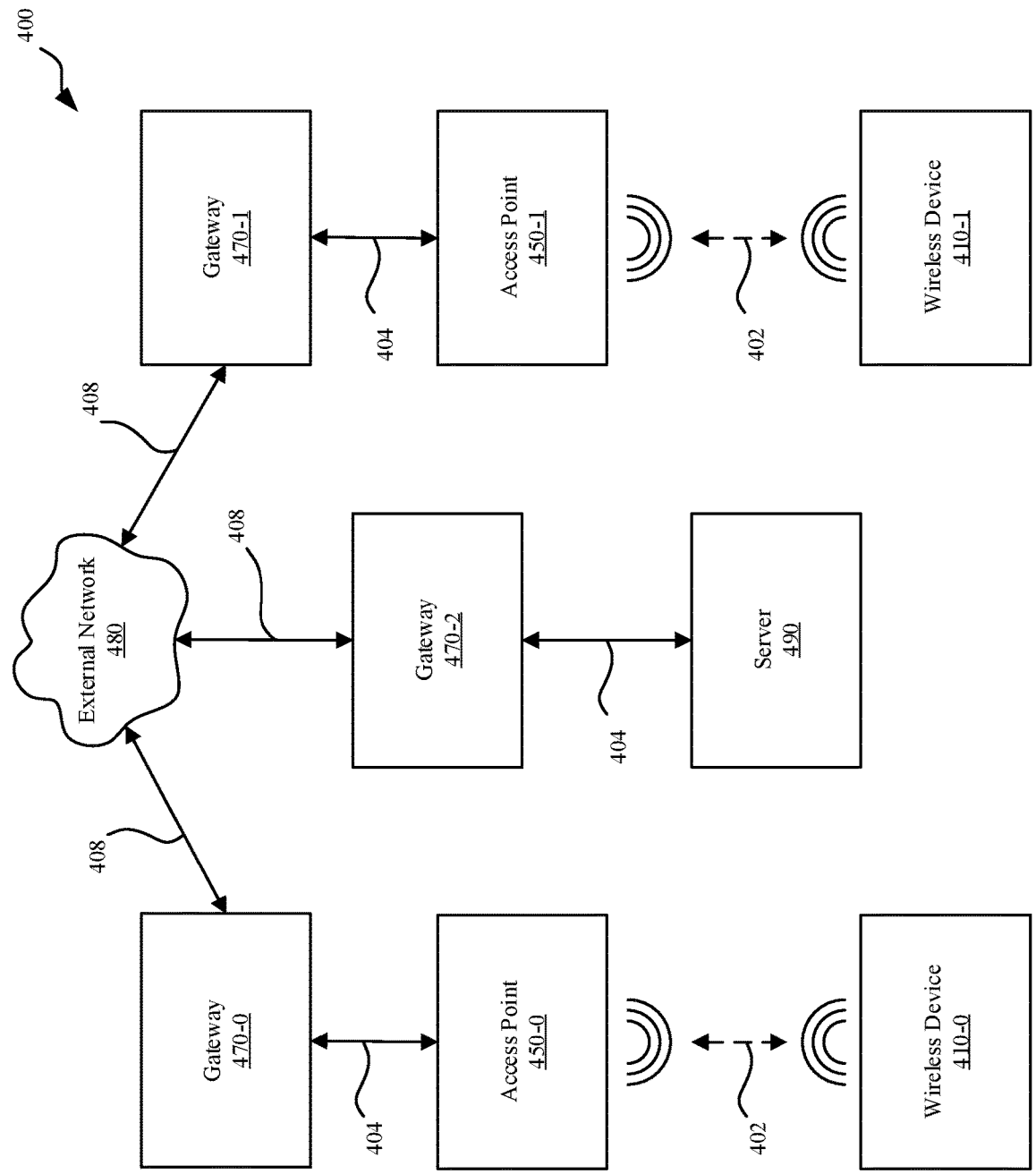
FIG. 4 illustrates an example of an enterprise network, in accordance with some embodiments.

FIG. 4 illustrates an exemplary enterprise network 400, in accordance with some embodiments. The enterprise network 400 includes multiple gateways 470, each gateway 470 connected to an external network 480 via a network interface 408. A first AP 450-0 is connected to a first gateway 470-0 via a network interface 404, and a second AP 450-1 is connected to a second gateway 470-1 via a network interface 404. The first AP 450-0 and the first gateway 470-0 may be located in a first location, such as a first campus for a company in a first city, and the second AP 450-1 and the second gateway 470-1 may be located in a second location, such as a second campus for the company in a second city. Authorized wireless devices 410 may connect to the APs 450 at any location within range via wireless interfaces 402.

The first gateway 470-0 communicates with the second gateway 470-1 via the external network 480. Unlike in most residential wireless networks, where a single gateway provides Internet access to devices connected to the wireless network, in the enterprise network 400, the gateways 470 can be configured to relay data between multiple, related wireless networks at different locations. In some embodiments, the gateways 470 are configured to relay data packets between the gateways 470 through tunnels established over the external network 480. Tunneling allows multiple wireless networks, communicatively coupled through an external network, to function as a single, common wireless network. Consequently, the first wireless device 410-0 and the second wireless device 410-1 can communicate as if the first wireless device 410-0 and the second wireless device 410-1 were connected to a single AP 150 configured like a switch, two APs 150 connected directly through a wired network interface 106, or two APs 150 connected indirectly through one or more other network hardware devices such as a switch or router.

In some embodiments, the enterprise network 400 includes a third gateway 470-2 connected to the external network 480 via a network interface 408. A server 490 is connected to the third gateway 470-2 via a network interface 404. The server 490 is a computing device, which may include, but is not limited to, a workstation, a blade server housed in a chassis, or a virtual machine (VM) hosted on shared hardware resources. The server 490 provides clients of the enterprise network 400 with one or more services. For example, the server 490 may implement a DHCP server for assigning IP addresses to hosts as the hosts connect to the enterprise network 400. As another example, the server 490 may implement a DNS server for resolving host names associated with the enterprise network 400. Network administrators may manually configure various devices within the enterprise network with specific host names and register those host names with the DNS server. The server 490 may also implement other types of services, such as hosting websites for an intranet, providing virtual machines for client applications executed on wireless devices 410, providing virtual storage solutions in conjunction with hardware storage resources, and the like.

It will be appreciated that the protocol 300 described hereinabove may work with the enterprise network 400 when the advertising message, the invitation message, and the acceptance message can bridge connections between the multiple gateways 470. For example, packets transmitted via the broadcast address and/or multicast address within a particular subnet are typically not relayed outside of that subnet by a router (e.g., the packet will stop being relayed at the network interface between the gateway and external network). However, when the gateways 470 are configured to relay packets over tunnels through the external network 480, such multicast packets may be encapsulated at the gateway 470 and can be transmitted as the payload in another data packet through the tunnel to be decrypted at the other gateway and forwarded to the multicast address in the different wireless network. Consequently, broadcast or multicast messages may reach devices 410 on different wireless networks within the same enterprise network 400.

Referring back to FIG. 3, the protocol 300 may be utilized to establish an encrypted communication channel between the wireless host 310 and the wireless client 320, as long as the wireless host 310 and the wireless client 320 are located on the wireless network 100 or on different wireless networks within the same enterprise network 400. However, once the wireless host 310 establishes the connection between its own socket and the socket set up by the wireless client 320, the wireless host 310 is no longer anonymous because the wireless client 320 can examine the source address of data packets arriving via the encrypted communication channel. In some deployments, it may be desired to further isolate the wireless host 310 from the wireless client 320, allowing the wireless host 310 to remain completely anonymous to the wireless client 320 even after the encrypted communication channel is established, and this anonymity can be accomplished using a third party server to relay encrypted communications between the wireless host 310 and the wireless client 320.

Figure 5:
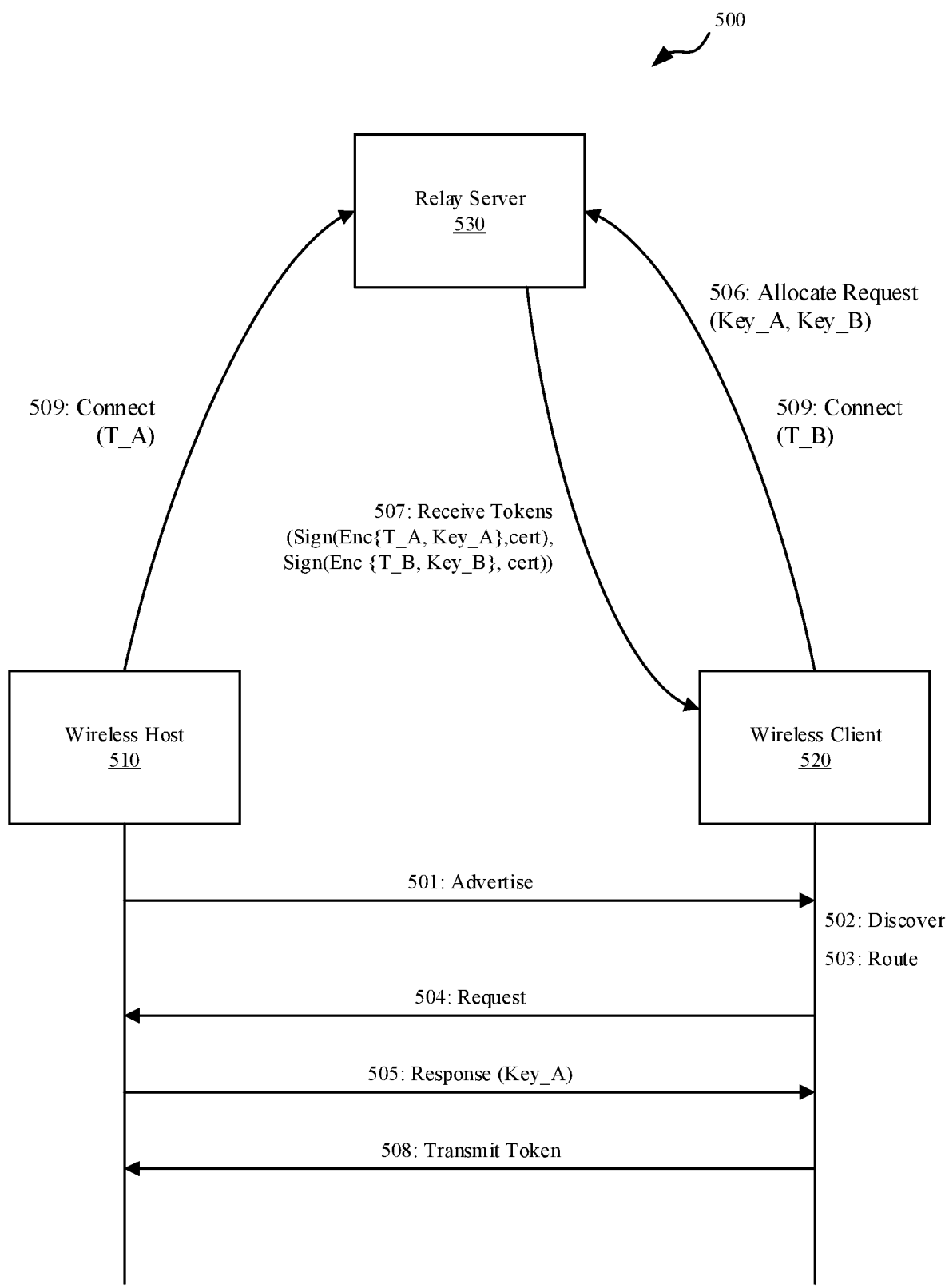
FIG. 5 illustrates an exemplary protocol for establishing a secure communication session between wireless devices over the enterprise network, in accordance with some embodiments.

FIG. 5 illustrates an example of a protocol 500 for establishing a secure communication session between wireless devices over the enterprise network 400, in accordance with some embodiments. As shown in FIG. 5, the protocol 500 may be performed by a wireless host 510 and a wireless client 520 in conjunction with a relay server 530. In some embodiments, the wireless host 510 is connected to the first AP 450-0 of the enterprise network 400, the wireless client 520 is connected to the second AP 450-1 of the enterprise network 400, and the relay server 530 is connected to the third gateway 470-2 of the enterprise network 400. In an alternate embodiment, the relay server 530 is not included in the enterprise network 400, but is accessible via the external network 480. For example, the functionality of the relay server 530 may be provided by a third-party as a service accessible over the Internet.

The protocol 500 begins at 501, where the wireless host 510 advertises that a service is available over the enterprise network 400. In some embodiments, the wireless host 510 transmits an advertising message using a broadcast address or a multicast address of the enterprise network 400. The advertising message may be received at the first gateway 470-0 and relayed to the second gateway 470(1) via a tunnel. In some embodiments, the wireless host 510 advertises that a service is available over the enterprise network 400 by transmitting a register service record using a multicast address to any mDNS responders implemented by one or more hosts on the enterprise network 400 that are configured to monitor the multicast address. The one or more mDNS responders may receive the register service request and create a plurality of DNS records for the service including a service record, a pointer record, and a text record. It will be appreciated that mDNS responders may be implemented within the wireless host 510, the wireless client 520, a server 490, and/or within various additional hosts connected to the enterprise network 400.

At 502, the wireless client 520 discovers services available over the enterprise network 400. In some embodiments, discovery may include monitoring a broadcast address or a multicast address to receive data packets that include a payload that identifies the service as being available over the enterprise network 400. In some embodiments, discovery may include transmitting a request to a server from which to receive in return a list of services that are available over the enterprise network 400. In some embodiments, discovery may include transmitting a request using a broadcast address or a multicast address of the enterprise network 400 to query one or more servers to return a list of available services on the enterprise network 400.

The wireless client 520 may transmit a request to any mDNS responders monitoring the multicast address on the enterprise network 400 to obtain in return a list of services matching a query based on a particular service type. The mDNS responders on the enterprise network 400 may return any pointer records that match the query. It will be appreciated that the mDNS responders may not be located on the same wireless network as the wireless client 520. For example, the wireless host 510 may implement an mDNS responder within the wireless network associated with the first gateway 470-0, while the wireless client 520 may be located on a different wireless network associated with the second gateway 470-1. Alternatively, the mDNS responder may be connected to the third gateway 470-2 and may not be part of either the wireless network associated with the first gateway 470-0 or the wireless network associated with the second gateway 470-1.

After receiving a list of available services the wireless client 520, at 503, determines a route associated with a service in the list of available services. Determining a route may include selecting one of the services identified in the list of available services discovered by the wireless client 520.

At 504, the wireless client 520 invites the wireless host 510 to establish a connection with the wireless client 520. The public key of the wireless client 520, the IP address of the wireless client 520, and the port number allocated by the wireless client 520 for the communication session are not required to be in the invitation message transmitted to the wireless host 510, although in some embodiments, the invitation message may still include this information. In some embodiments, the invitation message may include a host name for the relay server 530, and/or a relay service provided by the relay server 530, that identifies the relay server 530 associated with the secure communication session. Unlike in protocol 300, in which the wireless client 320 transmits this information to the wireless host 310 so that the wireless host 310 can establish a connection for the encrypted communication channel, the protocol 500 only requires that the wireless host 510 be informed that a communication session is being requested by a wireless client, e.g., by wireless client 520, within the enterprise network 400. The invitation message may be transmitted using the broadcast address or the multicast address of the enterprise network 400.

At 505, the wireless host 510 transmits an acceptance message to the wireless client 520. In some embodiments, the wireless host 510 transmits the acceptance message to the wireless client 520 using a broadcast address or using a multicast address of the wireless network 400. The acceptance message can include a public key associated with the wireless host 510. In some embodiments, the public key can be an ephemeral 256-byte (e.g., 2048-bit) key created by the wireless host 510 for use with a particular communication session.

At 506, the wireless client 520 transmits a request to the relay server 530 to allocate a relay connection for the secure communication session. In some embodiments, the relay server 530 is associated with a well-known IP address or with a host name resolvable by either a conventional DNS server or an mDNS responder within the enterprise network 400. The wireless client 520 and the wireless host 510 may be configured to use the relay server 530 to relay data packets between the wireless host 510 and the wireless client 520 using a pair of communication channels connected to the relay server 530. In some embodiments, the wireless client 520 may select the relay server 530 to use for the secure communication session and may include an address or a host name associated with the relay server 530 to the wireless host 510 in the invitation message. In some embodiments, the request transmitted from the wireless client 520 to the relay server 530 includes the public key associated with the wireless host 510 as well as a public key associated with the wireless client 520.

At 507, the relay server 530 transmits a response to the request to the wireless client 520, the response including a pair of tokens associated with the relay connection. Each token may identify a particular socket allocated by the relay server 530 for the secure communication session. The relay server 530 may maintain a table that associates issued tokens with particular sockets of a network interface included in the relay server 530, and the table may also associate each token with a corresponding token that is allocated for a particular instance of a relay connection.

In some embodiments, the relay server 530 encrypts a first token (T_A) using the public key associated with the wireless host 510 and a private key associated with the relay server 530 and signs the encrypted first token using a certificate associated with the relay server 530. Additionally, the relay server 530 encrypts a second token (T_B) using the public key associated with the wireless client 520 and the private key associated with the relay server 530 and signs the encrypted second token using the certificate associated with the relay server 530. The relay server 530 then transmits the signed and encrypted tokens to the wireless client 520. In some embodiments, the tokens are encrypted but not signed with a certificate.

It will be appreciated that, in some embodiments, the request to allocate the relay connection and the response to the request may be transmitted to the relay server 530 via a unicast address rather than via a broadcast or via a multicast address. As described above, the wireless client 520 may be pre-configured to use a particular relay server associated with a known unicast IP address. Alternatively, the wireless client 520 may be pre-configured to use a particular relay server associated with a known host name. The wireless client 520 can be configured to translate the known host name for the relay server 530 into a unicast IP address by sending a DNS query to a DNS server using a unicast IP address or by sending a DNS query to an mDNS responder using a multicast address of the enterprise network 400. In some embodiments, the request to allocate the relay connection and the response to the request may be transmitted to the relay server 530 via a broadcast address or via a multicast address of the enterprise network 400. However, it will be appreciated that in some embodiments where the request is transmitted via a multicast address, the relay server 530 includes an mDNS responder and must be located within the enterprise network 400.

At 508, the wireless client 520 transmits a token to the wireless host 510. At 506, the wireless client 520 received two tokens from the relay server 530: a first token associated with the wireless host 510, and a second token associated with the wireless client 520. In some embodiments, the wireless client 520 authenticates the signed and encrypted second token using a public key associated with the certificate. The public key associated with the certificate may be maintained by a certificate authority or may be provided by the relay server 530 if the certificate is self-signed. If the encrypted second token is authenticated, then the wireless client 520 decrypts the second token (T_B) using a private key associated with the wireless client 520 and the public key associated with the relay server 530. It will be appreciated that the public key associated with the certificate differs from the public key used to encrypt the second token. The public key associated with the certificate is used for all communication sessions that use the certificate for authentication. In contrast, the public key used to encrypt the second token may be an ephemeral key created for a particular communication session and discarded after the communication session terminates.

While the wireless client 520 can decrypt the second token (T_B) using the private key for the particular communication session created and known by the wireless client 520, the wireless client 520 cannot decrypt the first token (T_A) because the first token (T_A) was encrypted by the relay server 530 using a public key associated with the wireless host 510. Therefore, the wireless client 520 transmits the signed and encrypted first token to the wireless host 510, where the wireless host 510 authenticates the signed and encrypted first token using the public key associated with the certificate. If the encrypted first token is authenticated, then the wireless host 510 decrypts the first token (T_A) using a private key associated with the wireless host 510 and the public key associated with the relay server 530.

At 509, the wireless host 510 and the wireless client 520 each establish a connection with the relay server 530. In some embodiments, the wireless host 510 transmits the first token (T_A) to the relay server 530 as part of a connection request message. The relay server 530 establishes a connection between a first socket associated with the first token and the wireless host 510. Independently, the wireless client 520 transmits the second token (T_B) to the relay server 530 as part of another connection request message. The relay server 530 establishes a connection between a second socket associated with the second token and the wireless client 520. Again, the relay server 530 associates the first socket with the first token and associates the second socket with the second token when the tokens were created as described for 507. The relay server 530 then configures the relay connection such that the first socket relays packets to the second socket and the second socket relays packets to the first socket.

The wireless host 510 and the wireless client 520 may then transmit secure encrypted data packets over the communication channel established through the relay server 530. The data packets may be encrypted using the public keys and private keys created for the secure communication session by the wireless host 510 and the wireless client 520. However, the wireless host 510 addresses the data packets to the first socket created by the relay server 530, and the wireless client 520 addresses the data packets to the second socket created by the relay server 530. The relay server 530 cannot decrypt the payloads of the data packets because the relay server 530 is not aware of the private keys for the secure communication session created by the wireless host 510 and the wireless client 520. Similarly, the wireless client 520 is not aware of the address of the wireless host 510, and the wireless host 510 may not be aware of the address of the wireless client 520 if the wireless client 520 did not provide an address within the invitation message transmitted to the wireless host 510 at 504.

Figure 6:
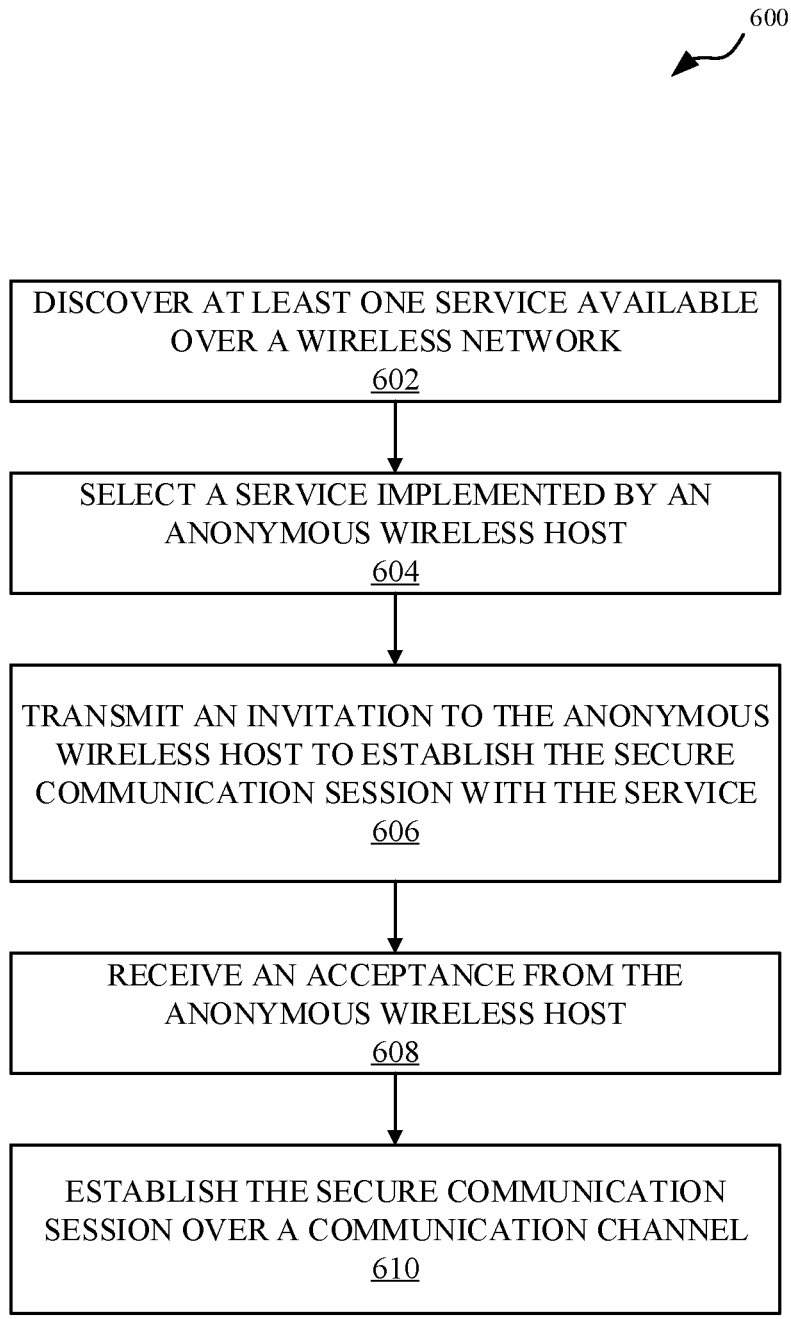
FIG. 6 illustrates a flowchart of an exemplary method to establish a secure communication session with an anonymous wireless host, in accordance with some embodiments.

FIG. 6 illustrates a flowchart of an exemplary method 600 to establish a secure communication session with an anonymous wireless host, in accordance with some embodiments. The method 600 may be implemented by hardware or software, or some combination of hardware and software including, although not limited to, a processor configured to execute instructions that cause the method to be performed. In various embodiments, the method 600 may be performed by the wireless client 320 or by the wireless client 520.

At 602, at least one service is discovered as being available over a wireless network. In some embodiments, a wireless client receives an advertising message that indicates a particular service is available over the wireless network. In another embodiment, the wireless client sends a service discovery request to a broadcast address or a multicast address of the wireless network, and the wireless client monitors the broadcast address or the multicast address for a response to the service discovery request. The response may include a plurality of pointer records that indicate various services available over the wireless network. It will be appreciated that multiple responses from a plurality of responders may be received in response to a single service discovery request (e.g., multiple mDNS responders on the wireless network may respond to a single service discovery request), each response including one or more pointer records.

At 604, a service implemented by an anonymous wireless host is selected from at least one service discovered as being available over the wireless network. In some embodiments, the wireless client automatically selects the service from the list of available services discovered on the wireless network. In some embodiments, the wireless client prompts a user to select the service from a list of available services.

At 606, an invitation is transmitted to the anonymous wireless host to establish the secure communication session with the service. In some embodiments, the invitation includes an IP address of the wireless client and a port number allocated by the wireless client for the secure communication session. The secure communication session may be established in order to exchange data with a process or application executed by a processor of the wireless client and the service implemented by the anonymous wireless host. The invitation may also include a public key generated by the wireless client as part of an asymmetric private key/public key pair for encrypting data within the secure communication session.

At 608, an acceptance is received from the anonymous wireless host. In some embodiments, the wireless client monitors a broadcast address or a multicast address for a response to the invitation sent via the broadcast address or the multicast address. The acceptance may be received from the anonymous wireless host via the broadcast address or the multicast address. Consequently, the acceptance may be received by the wireless client without the wireless client learning an address associated with the anonymous wireless host, e.g., the acceptance may not include a source address of the anonymous wireless host in a packet header.

At 610, the secure communication session is established with the service implemented by the anonymous wireless host. In some embodiments, the wireless client creates a socket associated with the address and port number of a wireless interface that were included in the invitation transmitted to the anonymous wireless host. The socket is configured to listen at the port number for a connection created by the anonymous wireless host. The anonymous wireless host, after transmitting the acceptance to the wireless client, is configured to create a socket associated with the address and port number of a wireless interface of the anonymous wireless host allocated for the secure communication session. The anonymous wireless host creates the connection between the socket associated with the wireless interface of the anonymous wireless host and the socket associated with the wireless interface of the wireless client utilizing the address and port number provided by the wireless client in the invitation.

Figure 7:
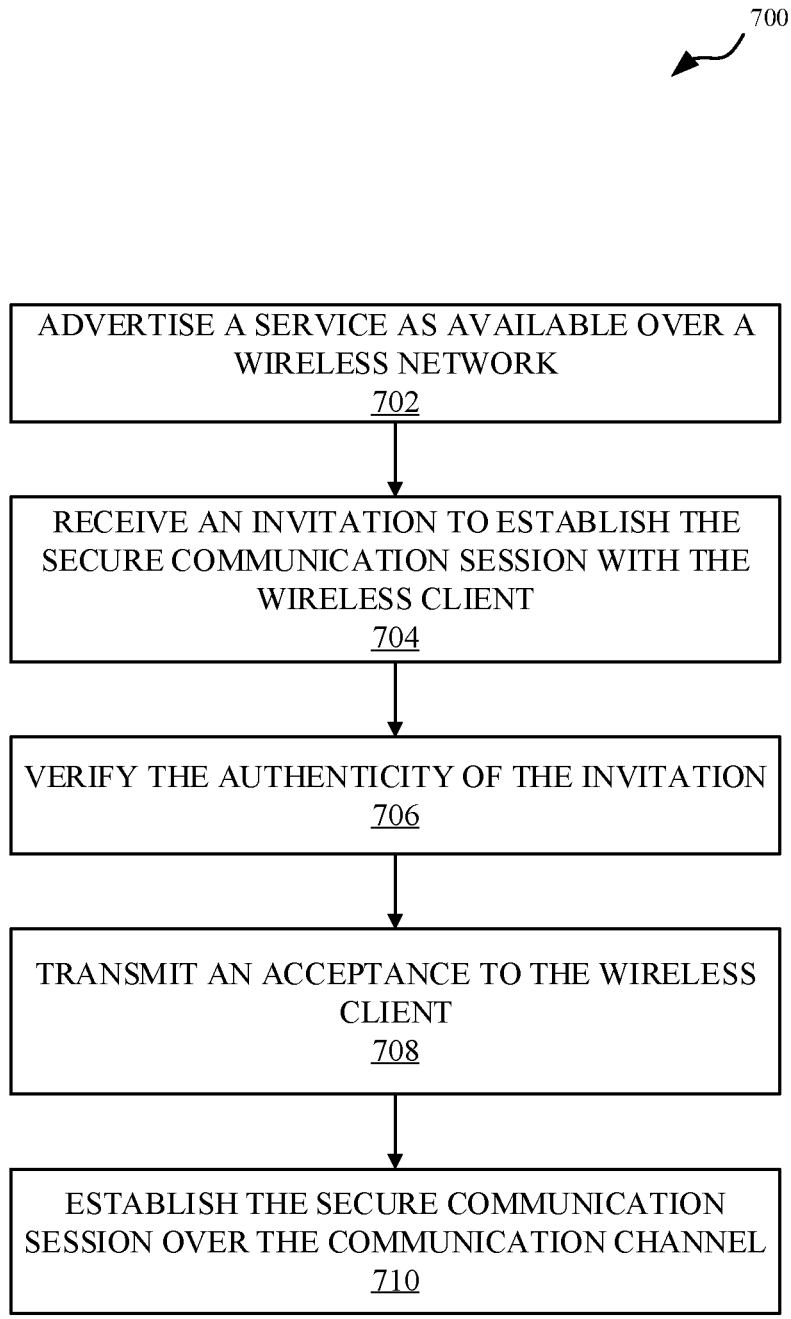
FIG. 7 illustrates a flowchart of an exemplary method to establish a secure communication session anonymously with a wireless client, in accordance with some embodiments.

FIG. 7 illustrates a flowchart of an exemplary method 700 to establish a secure communication session anonymously with a wireless client, in accordance with some embodiments. The method 700 may be implemented by hardware or software, or some combination of hardware and software including, although not limited to, a processor configured to execute instructions that cause the method steps to be performed. In various embodiments, the method 700 may be performed by the wireless host 310 or the wireless host 510.

At 702, a service is advertised as being available over a wireless network. In some embodiments, a wireless host transmits an advertising message via a broadcast address or via a multicast address of the wireless network that indicates the service is available over the wireless network. In some embodiments, the wireless host registers the service with a service discovery service as being available over the wireless network.

At 704, an invitation is received from a wireless client to establish a secure communication session with the service via a communication channel. In some embodiments, the invitation includes an IP address of the wireless client and a port number allocated by the wireless client for a secure communication session established via the communication channel. The secure communication session may be established in order to exchange data with a process or application executed by a processor of the wireless client and the service implemented by the anonymous wireless host. The invitation may also include a public key generated by the wireless client as part of an asymmetric private key/public key pair for encrypting data within the secure communication session.

At 706, the authenticity of the invitation is verified. In some embodiments, the invitation is signed by the wireless client using a certificate, and the wireless host is configured to only respond to authorized wireless clients that sign the invitation with that certificate. In some embodiments, the wireless client includes a username and a password in the invitation, and the anonymous wireless client is configured to only respond to authorized wireless clients that provide registered credentials that ensure authenticity of the wireless client.

At 708, an acceptance is transmitted to the wireless client that indicates the anonymous wireless host will establish the secure communication session via the communication channel. In some embodiments, the anonymous wireless host transmits the acceptance to the wireless client via a broadcast address or a multicast address. The invitation may also include a public key generated by the wireless host as part of an asymmetric private key/public key pair for encrypting data within the secure communication session.

At 710, the secure communication session is established over the communication channel. In some embodiments, the wireless host creates a socket associated with an address and port number of a wireless interface that is allocated for the secure communication session with the wireless client. A connection is established over the communication channel between the allocated socket of the anonymous wireless host and a socket created by the wireless client at the IP address and port number provided by the wireless client in the invitation. The public keys exchanged in the invitation and acceptance may be utilized to encrypt data transmitted in the secure communication session via the communication channel.

Representative Embodiments

In some embodiments, a method for establishing a secure communication session with an anonymous wireless host includes a wireless client: (i) discovering at least one service advertised as available over a wireless network; (ii) selecting, from the at least one service, a service that is implemented by the anonymous wireless host; (iii) transmitting, via a broadcast address or a multicast address of the wireless network, an invitation to the anonymous wireless host to establish the secure communication session with the service; (iv) receiving, via the broadcast address or the multicast address, an acceptance from the anonymous wireless host; and (v) establishing the secure communication session over a communication channel, where the secure communication session is used to exchange encrypted data between the selected service and the wireless client.

In some embodiments, the wireless client discovers the at least one service advertised as available over the wireless network by at least transmitting a discovery request using the broadcast address or the multicast address. In some embodiments, the wireless client transmits the discovery request to a multicast Domain Name System (mDNS) responder using the multicast address. In some embodiments, the invitation includes a message that includes: a public key created by the wireless client, an IP address of the wireless client, and a port number allocated by the wireless client for the secure communication session. In some embodiments, the public key created by the wireless client is created for the secure communication session. In some embodiments, the public key created by the wireless client is an ephemeral public key used for the secure communication session and subsequently not used, e.g., discarded. In some embodiments, the invitation further includes a credential associated with the wireless client. In some embodiments, the acceptance includes a message that includes a public key created by the anonymous wireless host. In some embodiments, the public key created by the anonymous wireless host is created for the secure communication session. In some embodiments, the public key created by the anonymous wireless host is an ephemeral public key used for the secure communication session and subsequently not used, e.g., discarded. In some embodiments, the public key created by the wireless client is associated with a corresponding private key created by the wireless client. In some embodiments, the public key created by the anonymous wireless host is associated with a corresponding private key created by the anonymous wireless host. In some embodiments, the public keys and private keys are created for the secure communication session. In some embodiments, the public keys and private keys are ephemeral keys created for the secure communication session and subsequently not used, e.g., discarded. In some embodiments, the public keys and corresponding private keys created by both the wireless client and the anonymous wireless host include ephemeral 256-byte keys that are discarded when the secure communication session is terminated. In some embodiments, the wireless client establishes the secure communication session by at least: (i) creating a socket associated with a network interface corresponding to an address of the wireless client; (ii) configuring the socket to listen for packets associated with a port number of the network interface; and (iii)

establishing a tunnel between the socket and a corresponding socket of the anonymous wireless host. In some embodiments, the secure communication session is established through a relay server.

In some embodiments, a client includes a wireless interface for connecting to a wireless network, a processor, and a memory storing instructions that, when executed by the processor, cause the client to establish a secure communication session with a host by: (i) transmitting a discovery request using a broadcast address or a multicast address of the wireless network; (ii) receiving a response to the discovery request that indicates at least one service available over the wireless network; (iii) selecting, from the at least one service, a service that is implemented by the host; (iv) transmitting, via the broadcast address or the multicast address, an invitation to the host to establish the secure communication session with the service; (v) receiving, via the broadcast address or the multicast address, an acceptance from the host; and (vi) establishing the secure communication session over a communication channel, where the secure communication session is used to exchange encrypted data between the service and the client.

In some embodiments, the wireless network includes one or more gateways coupled to one or more access points; the client is connected, via a client wireless interface, to a first access point of the one or more access points; and the host is connected, via a wireless interface of the host, to the first access point or to a second access point of the one or more access points. In some embodiments, when (i) the host is connected to the second access point, (ii) the first access point is coupled, via a network interface of the first access point, to a first gateway of the one or more gateways, and (iii) the second access point is coupled, via a network interface of the second access point, to a second gateway of the one or more gateways, the first gateway is further configured to establish a network tunnel with the second gateway over which data packets transmitted from the client to the host are relayed. In some embodiments, the wireless network includes at least one multicast Domain Name System (mDNS) responder configured to register services available over the wireless network and return the response to the discovery request to the client via the multicast address. In some embodiments, a first mDNS responder of the at least one mDNS responder is configured to receive, from the host, a register service request associated with the service and generate, in response to the register service request, multiple DNS records including a service record, a pointer record, and a text record, where the multiple DNS records are stored in a memory accessible by the first mDNS responder. In some embodiments, a relay server is configured to allocate a relay connection to establish the secure communication session between the client and the host through the relay connection.

In some embodiments, a non-transitory computer readable medium stores instructions that, when executed by a processor, cause a wireless client to establish a secure communication session with an anonymous wireless host, by: (i) discovering at least one service advertised as available over a wireless network; (ii) selecting, from the at least one service, a service that is implemented by the anonymous wireless host; (iii) transmitting to the anonymous wireless host, via a broadcast address or a multicast address of the wireless network, an invitation to establish the secure communication session with the service; (iv) receiving, via the broadcast address or the multicast address, an acceptance from the anonymous wireless host; and (v) establishing the secure communication session over a communication channel, where the secure communication session is used to exchange encrypted data between the service and the wireless client.

In some embodiments, the wireless client discovers that at least one service advertised as available over the wireless network by at least transmitting a discovery request using the broadcast address or the multicast address. In some embodiments, the discovery request is transmitted to a multicast Domain Name System (mDNS) responder using the multicast address. In some embodiments, the invitation includes a message that includes: (i) a public key created by the wireless client, (ii) an IP address of the wireless client, and (iii) a port number allocated by the wireless client for the secure communication session. In some embodiments, the public key created by the wireless client is created for the secure communication session. In some embodiments, the public key created by the wireless client is an ephemeral public key used for the secure communication session and subsequently not used, e.g., discarded. In some embodiments, the acceptance includes a message that include a public key created by the anonymous wireless host. In some embodiments, the public key created by the anonymous wireless host is created for the secure communication session. In some embodiments, the public key created by the anonymous wireless host is an ephemeral public key used for the secure communication session and subsequently not used, e.g., discarded. In some embodiments, the public key created by the wireless client is associated with a corresponding private key created by the wireless client. In some embodiments, the public key created by the anonymous wireless host is associated with a corresponding private key created by the anonymous wireless host. In some embodiments, the public keys and private keys are created for the secure communication session. In some embodiments, the public keys and private keys are ephemeral keys created for the secure communication session and subsequently not used, e.g., discarded. In some embodiments, the public keys and corresponding private keys created by both the wireless client and the anonymous wireless host include ephemeral 256-byte keys that are discarded when the secure communication session is terminated. In some embodiments, the wireless network includes one or more gateways coupled to one or more access points, where the wireless client is connected to a first access point of the one or more access points via a wireless interface of the wireless client, and where the anonymous wireless host is connected, via a wireless interface of the anonymous wireless host, to the first access point or to a second access point of the one or more access points.

In some embodiments, a method for anonymously establishing a secure communication session with a wireless client by an anonymous wireless host includes the anonymous wireless host: (i) advertising a service implemented by the anonymous wireless host as available over a wireless network; (ii) receiving, via a broadcast address or a multicast address of the wireless network, an invitation to establish the secure communication session with the wireless client; (iii) transmitting, via the broadcast address or the multicast address, an acceptance to the wireless client; and (iv) establishing the secure communication session over a communication channel, where the secure communication session is used to exchange encrypted data between the service and the wireless client.

In some embodiments, the anonymous wireless host advertises the service as available over the wireless network by at least transmitting an advertising message using the broadcast address or the multicast address of the wireless network. In some embodiments, the advertising message is transmitted to a multicast Domain Name System (mDNS) responder using the multicast address. In some embodiments, the invitation includes a message that includes: a public key created by the wireless client, an IP address of the wireless client, and a port number allocated by the wireless client for the secure communication session. In some embodiments, the invitation further includes credentials associated with the wireless client. In some embodiments, the public key created by the wireless client is created for the secure communication session. In some embodiments, the public key created by the wireless client is an ephemeral public key used for the secure communication session and subsequently not used, e.g., discarded. In some embodiments, the acceptance includes a message that includes a public key created by the anonymous wireless host. In some embodiments, the public key created by the anonymous wireless host is created for the secure communication session. In some embodiments, the public key created by the anonymous wireless host is an ephemeral public key used for the secure communication session and subsequently not used, e.g., discarded. In some embodiments, the public key created by the wireless client is associated with a corresponding private key created by the wireless client. In some embodiments, the public key created by the anonymous wireless host is associated with a corresponding private key created by the anonymous wireless host. In some embodiments, the public keys and private keys are created for the secure communication session. In some embodiments, the public keys and private keys are ephemeral keys created for the secure communication session and subsequently not used, e.g., discarded. In some embodiments, the public keys and corresponding private keys created by both the wireless client and the anonymous wireless host include ephemeral 256-byte keys that are discarded when the secure communication session is terminated. In some embodiments, the anonymous wireless host establishes the secure communication session by at least: (i) creating a socket associated with a network interface corresponding to a network address of the anonymous wireless host; (ii) connecting the socket to a corresponding socket of the wireless client; and (iii) establishing a tunnel between the socket and the corresponding socket. In some embodiments, the secure communication session is established through a relay server.

In some embodiments, a host includes a wireless interface for connecting to a wireless network, a processor, and memory storing instructions that, when executed by the processor, cause the host to establish a secure communication session with a client by: (i) advertising a service as available over the wireless network; (ii) receiving, via a broadcast address or a multicast address of the wireless network, an invitation to establish the secure communication session with the client; (iii) transmitting, via the broadcast address or the multicast address, an acceptance to the client; and (iv) establishing the secure communication session over a communication channel, where the secure communication session is used to exchange encrypted data between the service and the client.

In some embodiments, the wireless network includes one or more gateways coupled to one or more access points, where the client is connected to a first access point of the one or more access points via a wireless interface of the client, and where the host is connected, via the wireless interface of the host, to the first access point or to a second access point of the one or more access points. In some embodiments, (i) the host is connected to the second access point, (ii) the first access point is coupled, via a network interface of the first access point, to a first gateway of the one or more gateways, and (iii) the second access point is coupled, via a network interface of the second access point, to a second gateway of the one or more gateways, and (iv) the first gateway is further configured to establish a network tunnel with the second gateway over which data packets transmitted from the client to the host are relayed. In some embodiments, the wireless network includes at least one multicast Domain Name System (mDNS) responder configured to register services available over the wireless network. In some embodiments, a first mDNS responder of the at least one mDNS responder is configured to (i) receive, from the host, a register service request associated with the service and (ii) generate, in response to the register service request, multiple DNS records including a service record, a pointer record, and a text record, where the multiple DNS records are stored in a memory accessible by the first mDNS responder. In some embodiments, a relay server is configured to allocate a relay connection to establish the secure communication session between the host and the client through the relay connection.

In some embodiments, a non-transitory computer readable medium stores instructions that, when executed by a processor, cause an anonymous wireless host to establish a secure communication session with a wireless client, by: (i) advertising a service as available over a wireless network; (ii) receiving, via a broadcast address or a multicast address of the wireless network, an invitation to establish the secure communication session with the wireless client; (iii) transmitting, via the broadcast address or the multicast address, an acceptance to the wireless client; and (iv) establishing the secure communication session over a communication channel, where the secure communication session is used to exchange encrypted data between the service and the wireless client.

In some embodiments, the anonymous wireless host advertises the service as available over the wireless network by at least transmitting a message using the broadcast address or the multicast address. In some embodiments, the message is a register service request transmitted to a multicast Domain Name System (mDNS) responder using the multicast address. In some embodiments, the invitation received by the host includes a message that includes: a public key created by the wireless client, an IP address of the wireless client, and a port number allocated by the wireless client for the secure communication session. In some embodiments, the acceptance includes a message that includes a public key created by the anonymous wireless host. In some embodiments, the public key created by the anonymous wireless host is created for the secure communication session. In some embodiments, the public key created by the anonymous wireless host is an ephemeral public key used for the secure communication session and subsequently not used, e.g., discarded. In some embodiments, the public key created by the wireless client is associated with a corresponding private key created by the wireless client. In some embodiments, the public key created by the anonymous wireless host is associated with a corresponding private key created by the anonymous wireless host. In some embodiments, the public keys and private keys are created for the secure communication session. In some embodiments, the public keys and private keys are ephemeral keys created for the secure communication session and subsequently not used, e.g., discarded. In some embodiments, the public keys and corresponding private keys created by both the wireless client and the anonymous wireless host include ephemeral 256-byte keys that are discarded when the secure communication session is terminated. In some embodiments, the wireless network includes one or more gateways coupled to one or more access points, where the wireless client is connected, via a wireless interface of the wireless client, to a first access point of the one or more access points, and where the anonymous wireless host is connected, via a wireless interface of the anonymous wireless host, to the first access point or to a second access point of the one or more access points.

Figure 8:
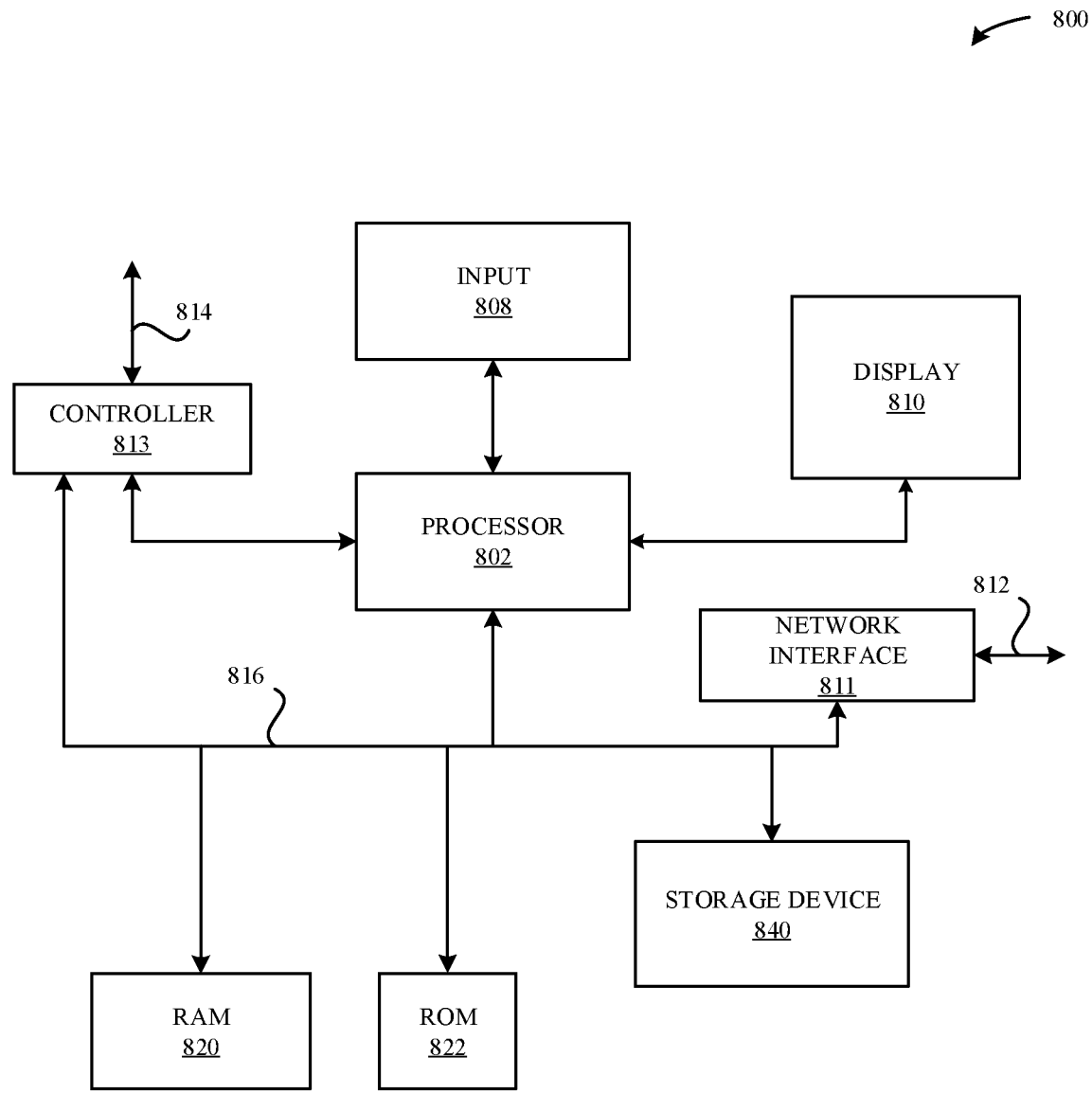
FIG. 8 illustrates a detailed view of an exemplary computing device that can be used to implement the various components described herein, in accordance with some embodiments.

FIG. 8 illustrates a detailed view of an exemplary computing device 800 that can be used to implement the various apparatus and/or methods described herein, in accordance with some embodiments. In particular, the detailed view illustrates various components that can be included in the computing devices illustrated in FIGS. 1 to 7 and/or described herein. For example, one or more of the wireless device(s) 110/410, access point(s) 150/450, gateway(s) 170/470, server(s) 490, the wireless client(s) 310/510, wireless host(s) 320/520, or any other device may be implemented, at least in part, to include the components of computing device 800. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to present visual information to the user. A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include a wireless transceiver.

The computing device 800 also include a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for establishing a secure communication session with an anonymous wireless host, the method comprising:
by a wireless client:
discovering at least one service advertised as available over a wireless network by transmitting a discovery request to a multicast Domain Name System (mDNS) responder using a multicast address;
selecting, from the at least one service, a service that is implemented by the anonymous wireless host;
transmitting, via a broadcast address or a multicast address of the wireless network, an invitation to the anonymous wireless host to establish the secure communication session with the service;
receiving, via the broadcast address or the multicast address, an acceptance from the anonymous wireless host; and
establishing the secure communication session over a communication channel, wherein the secure communication session is used to exchange encrypted data between the selected service and the wireless client,
wherein:
the invitation comprises a message that includes a public key created by the wireless client, an Internet Protocol (IP) address of the wireless client, and a port number allocated by the wireless client for the secure communication session; and
the anonymous wireless host is configured to use a local domain that cannot be mapped directly to a specific IP address of the anonymous wireless host.

2. The method of claim 1, further comprising the wireless client discovering a service advertised as available over the wireless network by transmitting another discovery request using the broadcast address or the multicast address.

3. The method of claim 1, wherein the invitation further comprises a credential associated with the wireless client.

4. The method of claim 1, wherein the acceptance comprises a message that includes a public key created by the anonymous wireless host.

5. The method of claim 4, wherein:
the public key created by the wireless client is associated with a corresponding private key created by the wireless client,
the public key created by the anonymous wireless host is associated with a corresponding private key created by the anonymous wireless host, and
the public keys and corresponding private keys created by both the wireless client and the anonymous wireless host comprise ephemeral 256-byte keys that are discarded when the secure communication session is terminated.

6. The method of claim 1, wherein establishing the secure communication session comprises:
creating a socket associated with a network interface corresponding to an address of the wireless client;
configuring the socket to listen for packets associated with a port number of the network interface; and
establishing a tunnel between the socket and a corresponding socket of the anonymous wireless host.

7. The method of claim 1, wherein the secure communication session is established through a relay server.

8. A client including a wireless interface for connecting to a wireless network, the client including a processor and memory storing instructions that, when executed by the processor, cause the client to establish a secure communication session with a host by:
transmitting a discovery request to a multicast Domain Name System (mDNS) responder using a multicast address of the wireless network;
receiving a response to the discovery request that indicates at least one service available over the wireless network;
selecting, from the at least one service, a service that is implemented by the host;
transmitting, via a broadcast address or the multicast address, an invitation to the host to establish the secure communication session with the service;
receiving, via the broadcast address or the multicast address, an acceptance from the host; and
establishing the secure communication session over a communication channel, wherein the secure communication session is used to exchange encrypted data between the service and the client,
wherein:
the invitation comprises a message that includes a public key created by the client, an Internet Protocol (IP) address of the client, and a port number allocated by the client for the secure communication session; and
the host is configured to use a local domain that cannot be mapped directly to a specific IP address of the host.

9. The client of claim 8, wherein:
the wireless network includes one or more gateways coupled to one or more access points,
the client is connected, via a client wireless interface, to a first access point of the one or more access points, and
the host is connected, via a wireless interface of the host, to the first access point or to a second access point of the one or more access points.

10. The client of claim 9, wherein when (i) the host is connected to the second access point, (ii) the first access point is coupled, via a network interface of the first access point, to a first gateway of the one or more gateways, and (iii) the second access point is coupled, via a network interface of the second access point, to a second gateway of the one or more gateways, the first gateway is further configured to establish a network tunnel with the second gateway over which data packets transmitted from the client to the host are relayed.

11. The client of claim 9, wherein the wireless network includes at least one multicast Domain Name System (mDNS) responder configured to register services available over the wireless network and return the response to the discovery request to the client via the multicast address.

12. The client of claim 11, wherein a first mDNS responder of the at least one mDNS responder is configured to receive, from the host, a register service request associated with the service and generate, in response to the register service request, a plurality of DNS records including a service record, a pointer record, and a text record, wherein the plurality of DNS records are stored in a memory accessible by the first mDNS responder.

13. The client of claim 8, wherein a relay server is configured to allocate a relay connection to establish the secure communication session between the client and the host through the relay connection.

14. A non-transitory computer readable medium storing instructions that, when executed by a processor, cause a wireless client to establish a secure communication session with an anonymous wireless host, by:
discovering at least one service advertised as available over a wireless network by transmitting a discovery request to a multicast Domain Name System (mDNS) responder using a multicast address;
selecting, from the at least one service, a service that is implemented by the anonymous wireless host;
transmitting to the anonymous wireless host, via a broadcast address or a multicast address of the wireless network, an invitation to establish the secure communication session with the service;
receiving, via the broadcast address or the multicast address, an acceptance from the anonymous wireless host; and
establishing the secure communication session over a communication channel, wherein the secure communication session is used to exchange encrypted data between the service and the wireless client,
wherein:
the invitation comprises a message that includes a public key created by the wireless client, an Internet Protocol (IP) address of the wireless client, and a port number allocated by the wireless client for the secure communication session; and
the anonymous wireless host is configured to use a local domain that cannot be mapped directly to a specific IP address of the anonymous wireless host.

15. The non-transitory computer readable medium of claim 14, wherein the wireless client discovers a service advertised as available over the wireless network by transmitting another discovery request using the broadcast address or the multicast address.

16. The non-transitory computer readable medium of claim 14, wherein:
the acceptance comprises a message that includes a public key created by the anonymous wireless host.

17. The non-transitory computer readable medium of claim 16, wherein:
the public key created by the wireless client is associated with a corresponding private key created by the wireless client,
the public key created by the anonymous wireless host is associated with a corresponding private key created by the anonymous wireless host, and
the public keys and corresponding private keys created by both the wireless client and the anonymous wireless host comprise ephemeral 256-byte keys that are discarded when the secure communication session is terminated.

18. The non-transitory computer readable medium of claim 16, wherein establishing the secure communication session comprises:

creating a socket associated with a network interface corresponding to an address of the wireless client;
configuring the socket to listen for packets associated with a port number of the network interface; and
establishing a tunnel between the socket and a corresponding socket of the anonymous wireless host.

19. The non-transitory computer readable medium of claim 14, wherein the wireless network includes one or more gateways coupled to one or more access points, wherein the wireless client is connected to a first access point of the one or more access points via a wireless interface of the wireless client, and wherein the anonymous wireless host is connected, via a wireless interface of the anonymous wireless host, to the first access point or to a second access point of the one or more access points.

20. The non-transitory computer readable medium of claim 14, wherein the secure communication session is established through a relay server.

* * * * *